(12) United States Patent
Frey et al.

(10) Patent No.: US 7,210,001 B2
(45) Date of Patent: Apr. 24, 2007

(54) METHODS OF AND APPARATUS FOR EFFICIENT BUFFER CACHE UTILIZATION

(75) Inventors: Alexander H. Frey, Wayzata, MN (US); Keith E. Conner, Plymouth, MN (US)

(73) Assignee: Adaptec, Inc., Milpitas, CA (US)

( * ) Notice: Subject to any disclaimer, the term of this patent is extended or adjusted under 35 U.S.C. 154(b) by 477 days.

(21) Appl. No.: 10/825,717

(22) Filed: Apr. 16, 2004

(65) Prior Publication Data

US 2004/0210794 A1    Oct. 21, 2004

Related U.S. Application Data

(63) Continuation-in-part of application No. 10/717,314, filed on Nov. 18, 2003, which is a continuation-in-part of application No. 09/691,579, filed on Oct. 18, 2000, now Pat. No. 6,725,392, which is a continuation-in-part of application No. 09/261,708, filed on Mar. 3, 1999, now Pat. No. 6,922,688, which is a continuation-in-part of application No. 09/439,440, filed on Nov. 15, 1999, now Pat. No. 6,530,036.

(51) Int. Cl.
    G06F 12/00        (2006.01)

(52) U.S. Cl. .................. 711/100; 711/118; 711/154; 711/119; 710/56

(58) Field of Classification Search ................ 711/100, 711/118, 154, 119; 710/56
See application file for complete search history.

(56) References Cited

U.S. PATENT DOCUMENTS 6,970,921 B1 * 11/2005 Wang et al. ................. 709/220

* cited by examiner

*Primary Examiner*—Kimberly N McLean
(74) *Attorney, Agent, or Firm*—Martine Penilla & Gencarella, LLP

(57) ABSTRACT

Efficient buffer cache utilization frees a data buffer as soon as data buffer processing is completed, and without losing association of the freed data buffer and a descriptor buffer. Separate free buffer link lists identify the freed data buffer and any freed descriptor buffer. The data buffer is rapidly processed then freed generally before completion of processing of the descriptor buffer, freeing the processed associated data buffer before the associated descriptor buffer is freed. The association of the processed free data buffer and the descriptor buffer may be ended to enable the more frequent use of the large capacity data buffer for other update requests.

37 Claims, 12 Drawing Sheets

METHODS OF AND APPARATUS FOR EFFICIENT BUFFER CACHE UTILIZATION

1. RELATED APPLICATIONS

The present application is continuation-in-part of two co-pending applications that are commonly assigned to the assignee of the present invention, the first of which is entitled "Controller Fault Recovery System For A Distributed File System", application Ser. No. 09/691,579, filed Oct. 18, 2000 (the "Parent Application"); and the second of which (the "Continuation Application") is entitled "Controller Fault Recovery System For A Distributed File System", application Ser. No. 10/717,314, filed Nov. 18, 2003, the Continuation Application being a continuation of the Parent Application; the Parent Application being a continuation-in-part of one co-pending application and one patent, each of which is also commonly assigned to the assignee of the present invention, the one co-pending application being entitled Computer System Storage, application Ser. No. 09/261,708, filed Mar. 31, 1999 (the '708 Application"); and the patent being U.S. Pat. No. 6,530,036, issued Mar. 4, 2003 entitled "Self-Healing Computer System Storage" (the "Patent"); the disclosures of each of the Parent Application, the Continuation Application, the '708 Application, and the Patent being incorporated by reference, and the benefit of 35 U.S.C. Section 120 is hereby claimed with respect to the Parent Application and the Continuation Application.

2. FIELD OF THE INVENTION

This invention relates generally to the field of efficient buffer cache utilization in computer storage systems, and more particularly to controller fault recovery methods and apparatus in which numerous read and write operations are performed for data access and for assuring recovery from faults, wherein during such read and write operations efficient buffer cache utilization frees a data buffer from its association with a corresponding descriptor buffer as soon as a state of processing of the data buffer is complete, so that the freed data buffer may be re-used in the buffer cache before processing of the descriptor buffer is complete.

3. BACKGROUND OF THE INVENTION

Buffer caches are used in computer storage systems to facilitate data storage and rapid access to stored data. Such computer storage systems may include controller data fault recovery systems. The buffer caches may include data buffers and associated header buffers, also known as descriptor buffers. The size of such data buffers is generally a large power of 2, such as 32 Kbytes. In contrast, the size of such descriptor buffers is generally a small power of 2, such as 256 bytes. As a result, it would be desirable to efficiently utilize such very much larger data buffers, for example, in systems in which access to data objects is facilitated by the data buffers.

However, in current data access architecture in which buffer caches are used, there is inefficient use of a data buffer and an associated descriptor buffer because that data buffer remains together with that descriptor buffer (i.e., in a "paired" relationship) for the life of the cache. Thus, the paired relationship may be described as being "permanent", or "permanent pairing", or "permanent paired architecture". Referring to FIGS. 1A and 1B, use of this permanent paired architecture is illustrated by a flow chart 100 (FIG. 1A) in which an operation 101 receives a data access request (or "DAR") from any system IOM 102 (FIG. 1B). Such data access request may be for data not previously stored (i.e., for new data), in which case the data access request may be referred to as a new data access request, or new access. Such data access request may also be for data previously stored (i.e., for old data), in which case the data access request may be referred to as an update request. In an operation 103, a determination is made as to whether any paired data buffer 104 and descriptor buffer 105 (referred to as a pair 106) are free. A free situation of the pair 106 is indicated in FIG. 1B by the paired data buffer 104 and descriptor buffer 105 being together on one common free buffer list 107. Only if both buffers 104 and 105 of the pair 106 are free will the determination "yes" be made and the methods move to an operation 108 to process the data access request. Else, an operation 109 returns to operation 103.

It may be understood that in the method and architecture of respective FIGS. 1A and 1B, the completion of processing of the data buffer 104 generally is intended to occur, and occurs, well before the completion of processing of the descriptor buffer 105 of the pair 106. However, in such architecture and method, neither the data buffer 104 nor the descriptor buffer 105 of the pair 106 is put on the common free buffer list 107 until processing of the (usually last to-be-processed) descriptor buffer 105 is complete. Thus, both buffers of the pair 106 remain unavailable (not on the common free buffer list 107) for use in the buffer cache 110 to respond to the next data access request until completion of the (usually) last-to-be completed processing of the descriptor buffer 105. The difference in the duration of such separate processing of the data buffer 104 and of the descriptor buffer 105 of the pair 106 may be as much as several seconds, for example.

With the permanent pairing architecture and method of respective FIGS. 1B and 1A, it may be understood that there is a need to more efficiently use the buffer cache 110. In other words, there is a need to substantially reduce the storage size (and thus the cost) of buffer caches, while still allowing the same or greater number of read/write operations in a unit of time as compared to buffer caches in the current permanent paired architecture, e.g., that operates as shown in FIGS. 1A and 1B.

4. SUMMARY OF THE INVENTION

Broadly speaking, the present invention fills these needs by providing efficient buffer cache utilization. In more detail, the present invention fills these needs by avoiding permanent pairing of a particular data buffer with a particular descriptor buffer. In the present invention, it has been determined that, upon completion of being processed, that particular data buffer could be ready for use in a buffer cache with data requested by a next data access request, but for the continuing togetherness as part of the pair (i.e., but for the permanent pairing). Such next data access request may be a new data access request or an update request. Such permanent pairing is avoided by freeing that particular data buffer, by which that particular data buffer becomes available for use, e.g., with a descriptor buffer other than that particular descriptor buffer, as soon as a state of processing of that particular data buffer is complete. Further, such freeing of that particular data buffer for such use may be done without losing the association of that particular data buffer with that particular descriptor buffer.

In one embodiment of the present invention, methods and apparatus provide for efficient buffer cache utilization by establishing in the buffer cache a data buffer and a descriptor buffer. The buffer cache is configured so that such data buffer may be freed without freeing such descriptor buffer. The present invention thus takes advantage of the rapid processing of such data buffer by freeing such processed data buffer before the more time-consuming processing of such descriptor buffer has been completed. As a result, the freeing of such processed data buffer may occur before such descriptor buffer is freed, which enables more frequent use of such data buffer, which has a large capacity and is thus more costly. Such enabling allows such data buffer to operate with other descriptor buffers for response to other data access requests. These and other aspects of the present invention result in more efficient use of the data buffers, and hence of the buffer cache.

In another embodiment of the present invention, a buffer cache includes a first data buffer and a first descriptor buffer. A free data buffer list is provided, and is configured to identify only the data buffer in a free condition. Thus, the cache is configured to place the first data buffer on the free data buffer list according to the state of completion of the processing of only the data buffer. As a result, the configuring of the buffer cache is such that the data buffer is placed on the free data buffer list independently of the state of completion of the processing of the descriptor buffer. For example, the buffer cache is configured so that the placing of the first data buffer on the free data buffer list occurs immediately upon the state of completion of processing of the data buffer being a complete state.

In yet another embodiment of the present invention, a free descriptor buffer list is provided in the buffer cache, and the buffer cache is configured to place the descriptor buffer on the free descriptor buffer list according to the state of completion of processing of only the descriptor buffer.

Other embodiments of the present invention may relate to a buffer cache having an efficient data buffer utilization characteristic in which a plurality of data buffers are provided. Also, there are a plurality of descriptor buffers, each of the descriptor buffers having a descriptor configured with a plurality of values. The values include values representing a data buffer that is free, and values representing a descriptor buffer that is free. The free data buffer values are changeable independently of the free descriptor buffer values to identify one of the data buffers that is free at the same time as a descriptor buffer associated with that one data buffer is not free.

In yet another embodiment of the present invention, a method establishes in a buffer cache a data buffer and a descriptor buffer. The data buffer and the descriptor buffer are configured to be separately processed in the use of the buffer cache. The method includes an operation of configuring the buffer cache to free the data buffer according to the state of completion of processing of only the data buffer. As a result, the configuring operation is performed so that data buffer freeing is independent of the state of processing of the descriptor buffer. This means that the configuring operation is performed to free the data buffer immediately upon the state of completion of processing of the data buffer being a complete state.

In a still further embodiment, the free data buffer list is configured as a free data buffer link list linking those data buffers that are free, and the buffer cache is configured to unlink from the link list those data buffers that are to be used in the cache.

In a yet further embodiment of the methods of the present invention, in addition to configuring the buffer cache to free the descriptor buffer according to the state of completion of the processing of descriptor buffer, there is an association operation in which associating of the data buffer and the descriptor buffer with each other is separate from the configuring operation in regard to the descriptor buffer.

In an additional embodiment of the methods of the present invention, the buffer cache is configured to receive a data access request, and a response to the data access request may be made using one of the data buffers that is associated with a second descriptor buffer with which the one data buffer is not currently associated, and instead the one data buffer is currently associated with a first descriptor buffer. The buffer cache is configured to end the current association of the one data buffer and the first descriptor buffer with each other and to associate the one data buffer and the second descriptor buffer with each other.

In an additional embodiment of the present invention, a data buffer and a descriptor buffer are established in association with each other for separate processing in the use of the buffer cache. By configuring the buffer cache so that upon completion of processing of the data buffer (which, e.g., may include writing the data from the data buffer to disk), the data buffer may be freed independently of any freeing of the descriptor buffer. Such freeing may be done substantially immediately upon such completion and by entering the data buffer on a free data buffer link list. The freeing of the data buffer independently of any freeing of the descriptor buffer may occur, for example, when there is still processing of the descriptor buffer remaining to be done, in which case such entering of the data buffer on the free data buffer link list occurs without also listing the associated descriptor buffer on any free buffer list, and while retaining the association of the data buffer and the descriptor buffer.

In a related embodiment of the methods of the present invention, when the descriptor buffer processing is completed the descriptor buffer may be freed according to the state of completion of the processing of only the descriptor buffer; and when that state is complete, only the descriptor buffer is placed on a free descriptor buffer list that is independent of the free data buffer list. Further, method operations may include retaining values in the descriptor buffer that is on the free descriptor buffer list. The data buffer freeing operation generally occurs before completion of the processing of the descriptor buffer, and the method may comprise the further operation of, upon completion of the descriptor buffer processing, placing only the descriptor buffer on the free descriptor buffer list.

In another related embodiment of the present invention, there are further operations of providing one buffer cache for use by each of a plurality of input-output managers. Each of the input-output managers manages the storage of a portion of a data object to physical memory. Another operation controls the input-output mangers to facilitate the storage of any portion of the data object to the physical memory by use of an associated data buffer and descriptor buffer from the one buffer cache. The data buffer may be taken from the respective free data buffer list and the descriptor buffer may be taken from the respective free descriptor buffer list.

Advantages resulting from the present invention include the freeing of the particular data buffer without freeing the particular descriptor buffer with which that particular data buffer is associated. Such freeing of that particular data buffer is a freeing independent of the state of that particular descriptor buffer and without waiting for completion of the processing of that particular descriptor buffer. Thus, such freeing of that particular data buffer is a freeing for other use of the much larger and more costly data buffer as compared to the smaller and less costly particular descriptor buffer. This advantage not only benefits from rapid processing of that particular data buffer, and freeing of that particular processed data buffer before any more time-consuming processing of that particular descriptor buffer has been completed, but has another main advantage. The present invention enables the storage size of the buffer cache to be reduced substantially while still allowing the same or greater number of read/write operations in a unit of time as compared to buffer caches in the current (e.g., permanent pairing) data access architecture and operations. Those current buffer caches have differently associated data buffers and descriptor buffers and different operations, both as shown in FIGS. 1A and 1B, for example. As a result, in the permanently paired architecture, the paired data buffers and descriptors remain permanently paired, in the associated relationship and both unavailable for other use until the completion of the processing of both the data buffer and the associated descriptor buffer. In contrast, in the present invention the freeing of the particular data buffer may occur before the particular descriptor buffer is freed, which enables quick and more frequent use of that particular large capacity, more costly data buffer for another use (e.g., for response to another update request) without waiting for completion of the processing of that particular descriptor buffer. These and other aspects of the present invention result in more efficient use of the data buffers.

5. BRIEF DESCRIPTION OF THE DRAWINGS

The present invention will be readily understood by the following detailed description in conjunction with the accompanying drawings, wherein like reference numerals designate like operational or structural elements.

FIG. 2C-2 is a schematic diagram illustrating the free descriptor buffer list configured with a link list descriptor doubly linked to both a more-recently-used free descriptor buffer and to a less-recently-used free descriptor buffer;

Figure 4:
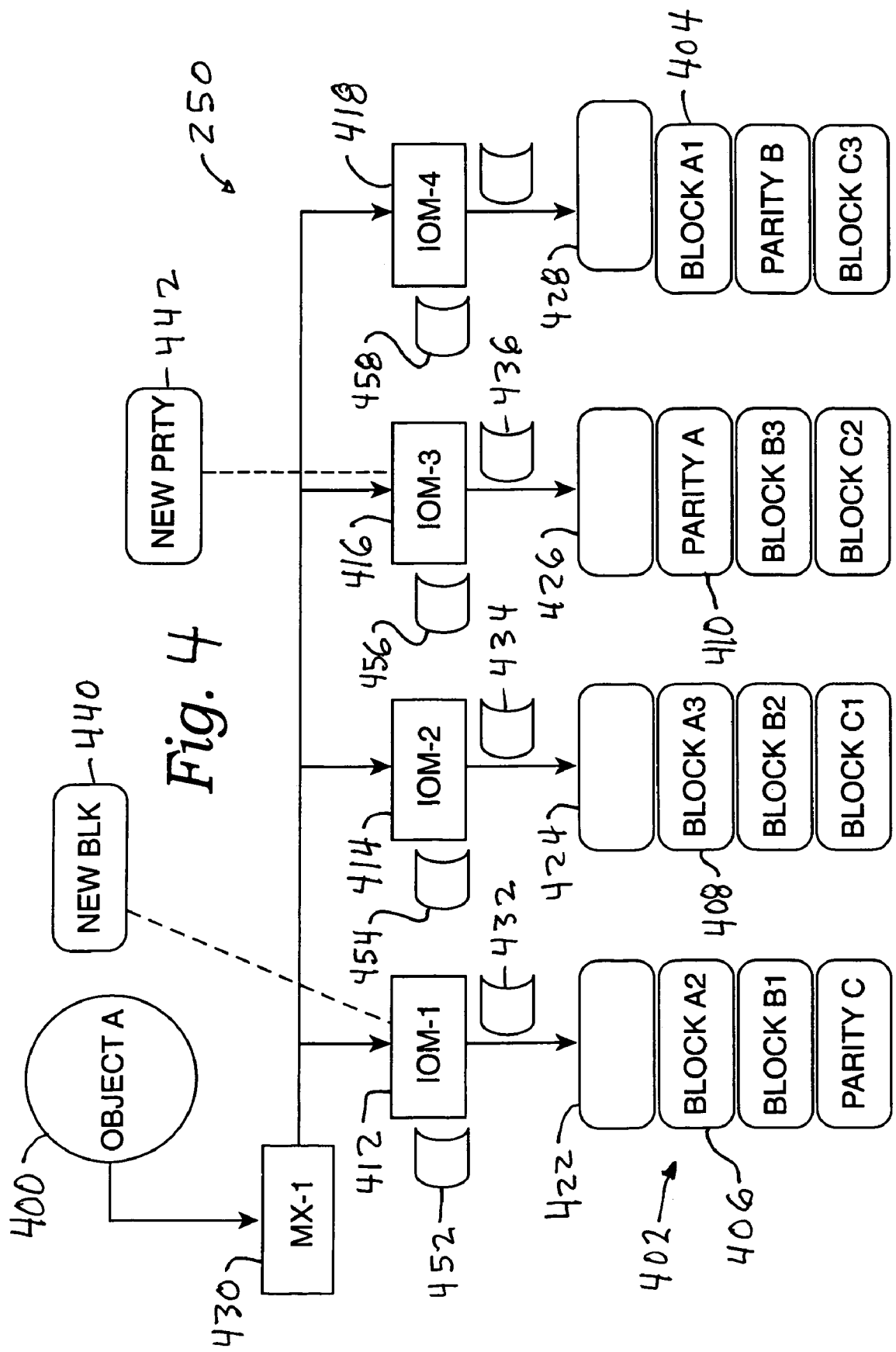
Figure 5:
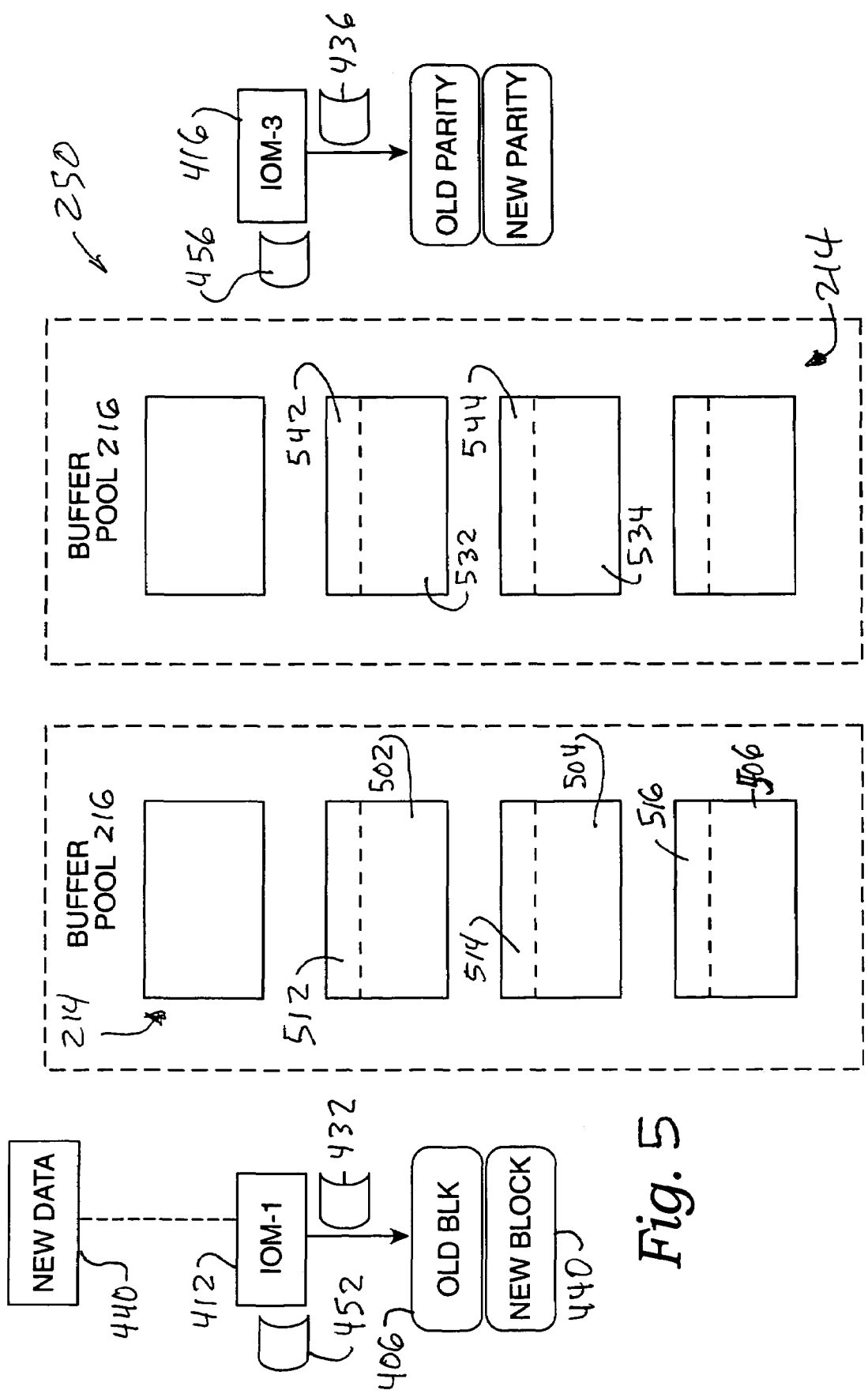

FIG. 4 is a schematic view of a fault recovery system having a plurality of input-output managers, each of which is configured to manage the storage of a portion of a data object to physical memory, wherein such managing is rendered more efficient by the buffer cache and methods of the present invention; and FIG. 5 is a schematic view of the fault recovery system of FIG. 4, illustrating buffer cache pools that may embody the efficient cache utilization architecture and methods of the present invention.

6. DETAILED DESCRIPTION OF THE PREFERRED EMBODIMENTS

An invention is described for efficient buffer cache utilization in a computer storage system, and for methods of efficient buffer cache utilization, which implement solutions to the above-described problems. By the present cache, system and methods, numerous read and write operations are performed for data access and for assuring recovery from faults, via use of the buffer cache. During such read and write operations, methods and apparatus for efficient buffer cache utilization free a particular data buffer from a particular associated descriptor buffer according to the state of completion of processing of only the data buffer and a first descriptor buffer configured with a state of completion of processing. As a result, the data buffer freeing is accomplished as soon as the processing of that particular data buffer has been completed so that the freed particular data buffer is available for re-use in the buffer cache generally before the particular descriptor buffer is available for use. Such data buffer freeing is without losing the association of the data buffer with the descriptor buffer. A method operation of the present invention may establish in the buffer cache, and the buffer cache may be configured with, a data buffer and a descriptor buffer. The buffer cache is configured so that the data buffer may be freed according to the state of completion of processing of only the data buffer. As a result, the data buffer may be freed without freeing the descriptor buffer. Thus, the freeing of the data buffer may occur before the associated descriptor buffer is freed.

In the following description, numerous specific details are set forth in order to provide a thorough understanding of the present invention. It will be understood, however, to one skilled in the art, that the present invention may be practiced without some or all of these details. In other instances, well known process operations and structures have not been described in detail in order not to obscure the present invention.

Architecture of Buffer Cache 200

Figure 2A:
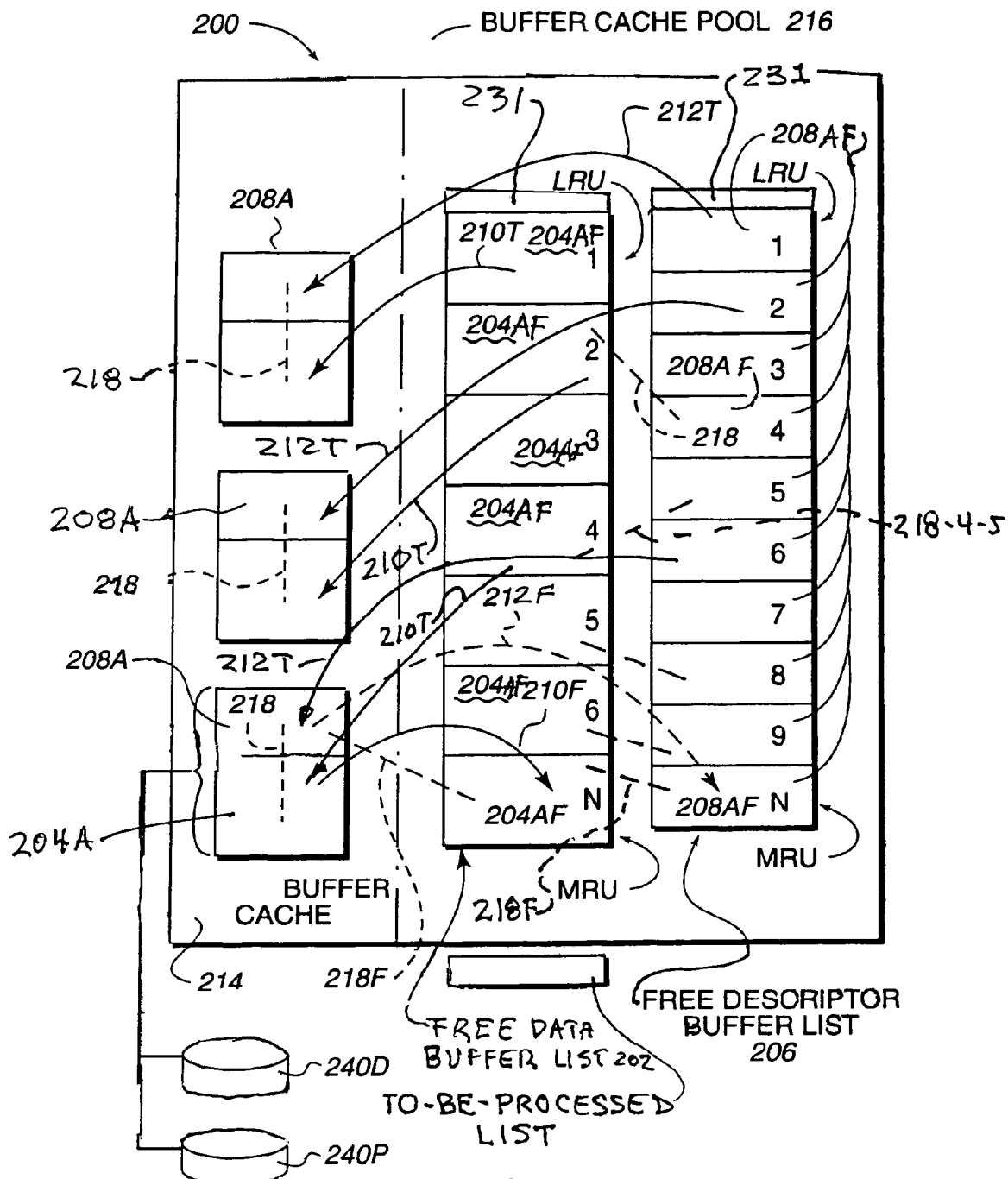
FIG. 2A illustrates an architecture of the present invention, including separate free buffer lists, one for only data buffers and one for only descriptor buffers, showing separate takings of free data buffers from the respective free data buffer list, and separate takings of free descriptor buffers from the respective free descriptor buffer list.

Referring now to FIG. 2A, there is an illustration of architecture 200 of the present invention, including a configuration of a free data buffer list 202 for one or more data buffers 204. The free data buffer list 202 is separate from a configuration of a free descriptor buffer list 206 for one or more descriptor buffers 208. FIG. 2A schematically illustrates separate takings, one separate taking being shown by an arrow 210T taking one free data buffer 204 from the respective free data buffer list 202. Another separate taking is shown by an arrow 212T taking one free descriptor buffer 208 from the respective free descriptor buffer list 206. In a preferred embodiment of the present invention, each of the lists 202 and 206 is a link list. When the lists 202 and 206 are link lists, the "takings" may be described as "unlinkings". The separate arrows 210T and 212T are directed into a buffer cache 214 of a buffer cache pool 216. Such separate takings enable use of the respective once-free data buffer 204 and of the once-free descriptor buffer 208 in the buffer cache 214 to read or store data.

In reverse, separate placing of a respective buffer 204 or 208 on the respective list 202 or 206 may be described as a separate "linking" to the respective link list. For example, the arrows 210F and 212F schematically illustrate the separate placing (or linking) from the buffer cache 214 to the respective free data buffer and descriptor buffer link lists.

By a dashed line 218, FIG. 2A also schematically illustrates a buffer cache configuration in which a particular one of the separately taken data buffers 204 and a particular one of the separately taken descriptor buffers 208 are established in the buffer cache 214 in association with each other, which association, linkings to the respective link lists, and unlinkings from the respective link lists, are described in more detail below. The particular data buffer 204 and the particular descriptor buffer 208 are said to be "associated" when in association with each other.

The data buffer 204 and descriptor buffer 208 may be separately processed in the use of the buffer cache pool 216. The buffer cache pool 216 is configured so that upon completion of processing of only the particular data buffer 204 (such that only the particular data buffer is in a "processing-complete" state, or "complete" state), the particular data buffer 204 may be freed (linked) to the free data buffer list 202 without freeing (linking) that particular associated descriptor buffer 208 to the respective descriptor buffer list 206. Thus, the respective freeings (linkings) to each of the respective lists 202 and 206 depend only on the state of the respective buffer to be freed (linked). The freeings are independent of each other and the linking of a respective particular data buffer or of a particular descriptor buffer is according to the state of completion of processing of only that respective particular data buffer or only that respective particular descriptor buffer. The freeing of that particular data buffer 204 is indicated schematically by arrow 210F returning to a back (or tail or MRU) end of that particular free data buffer list 202. For example, such freeing of that particular data buffer 204 may be done substantially immediately upon such completion of processing of only that particular data buffer 204, and by placing that particular data buffer 204 on the free data buffer list 202. Thus, the free data buffer list 202 is configured to identify only the data buffer 204F in a free condition and the free condition of that data buffer is independent of the state of completion of processing of that descriptor buffer.

In other words, the buffer cache is configured to place the data buffer 204F on the free data buffer list 202 even though there is an incomplete state of completion of processing of the associated descriptor buffer 208. The freeing of that particular descriptor buffer 208 is indicated schematically by arrow 212F returning to a back (or tail or MRU) end of the free descriptor buffer list 206. Such placing of that particular data buffer 204 on the free data buffer list 202 (arrow 210F) may occur without also listing that particular associated descriptor buffer 208 on any free buffer list, such as the free data buffer list 202 or the free descriptor list 206, and while retaining the association of that particular data buffer 204 and that particular descriptor buffer 208.

The data buffers 204 may be typical buffer caches that are configured to include the below-described features of the present invention. As noted above, the data storage capacity (size) of a data buffer 204 is generally a large power of 2, such as 32 Kbytes, and the size of a descriptor buffer 208 is generally a small power of 2, such as 256 bytes. The descriptor buffers 208 may be typical buffer caches that are configured to include the below-described features of the present invention. Due to the small data storage capacity of the descriptor buffers 208, the cost is generally substantially less than that of the data buffers 204, such as 95 percent less. Each particular descriptor buffer 208 includes a descriptor 230. When the free buffer lists 202 and 206 are link lists, for example, the descriptor 230 may have the numerous link values shown in Table 1. The link values are identified by "230" plus an identifier letter, e.g., as in "230a". "230b", "230c", etc., which letters are not necessarily shown in the Figures. When a particular descriptor buffer 208 is associated with a particular data buffer 204, and the particular associated buffers 204 and 208 act together to respond to a DAR, the various link values 230a–230n of that particular descriptor buffer 208 correspond to the data of that DAR and to that particular data buffer 204.

Among other link values, Table I is configured with the link values 230a, etc. to describe the current state of the data in the particular one of the data buffers 204 that corresponds to that particular descriptor buffer 208. The corresponding particular data buffer 204 may, for example, be the one particular data buffer 204 with which that particular descriptor buffer 208 is currently associated (as described below). Referring to Table I, and supplementing the above "Comments" of Table I only as is necessary for clarity, the value 230a designates a file ID and file offset. The file is identified by a global file identifier ("gfid"), which is a globally unique identifier. The offset is the logical block offset from byte 0 of the file, in increments of the file block size. Only one descriptor buffer 208 will have a particular file ID and offset at any one time. The link value 230c designates a disk address, such as in a data disk 240D, or a parity disk 240P, to which data is to be written or from which the data is to be read. The link value 230d designates whether a "dirty" state exists, that is it indicates that the contents of a data buffer 204 are more up-to-date than the contents of the corresponding disk (not shown). In this architecture 200, the disk address to which the data or parity was written is reflected in the metadata for the object. The link value 230e designates a metadata descriptor, which may be in the form of a pointer from data or parity buffer descriptor to its metadata descriptor.

TABLE I

Descriptor 230 For One Particular Descriptor Buffer 208

| Identifier of Link Values 230a–n In Descriptor 230 | Value Represents | Comment |
| --- | --- | --- |
| 230a | File ID and Offset | Global file identifier (gfid) and file block defining a specified portion of a data object |
| 230b | Hash Values | Enables hash algorithm to locate the descriptor buffer 208 |
| 230c | Disk address | Diskid and disk block address |

TABLE I-continued

Descriptor 230 For One Particular Descriptor Buffer 208

| Identifier of Link Values 230a–n In Descriptor 230 | Value Represents | Comment |
|---|---|---|
| 230d | DIRTY STATE | Indicates that the contents of a data buffer are more up-to-date than the disk |
| 230e | Metadata | Pointer from data or parity buffer descriptor to its metadata descriptor |
| 230f | Old disk address | Disk address of previously written data or parity |
| 230g | Size of data buffer, and address pointer to associated data buffer | Points to an associated buffer |
| 230h | Validity of data buffer | Data buffer contains valid data for the file ID and offset that are identified in the value 230a of this descriptor buffer 208 that is associated with the data buffer 204 |
| 230i | Data buffer link values, and identifies which list, i.e., the data buffer list | If NON_NULL, these link into a data buffer list, and identify the list to which the data buffer is linked |
| 230j | Descriptor buffer link values, and indentifies which list, i.e., the descriptor buffer list | If NON_NULL, these link into a descriptor buffer list, and identify the list to which the descriptor buffer is linked |
| 230k | Buffer pool | What type of buffer is this associated with |
| 230l | Mj = Master journal entry | First entry in the data node journal for this data write |
| 230m | Pin count for data buffer | Number of processes that require the data buffer |
| 230n | Pin count for descriptor buffer | Number of processes that require the descriptor buffer |

In one aspect, the link value 230g designates the size of a particular data buffer 204 with which a particular descriptor buffer 208 is associated. In another aspect, this link value 230g may also include an address pointer from the particular descriptor buffer 208 to the associated particular data buffer 204. If the address pointer of a link value 230g of a particular descriptor buffer 208 is described as being "NULL", then there is no data buffer 204 associated with that particular descriptor buffer 208, and there is thus no data buffer size represented by that link value 230g. Thus, a "NULL" value of link value 230g denotes a "dissociated" state of the particular descriptor buffer 208 (i.e., not associated with any data buffer 204 ). If the link value 230g represents an address pointer of a particular descriptor buffer 208 that is "NON-NULL", then there is an associated particular data buffer 204 corresponding to that particular descriptor buffer 208, the value 230g designates the size of that particular data buffer 204 with which that particular descriptor buffer 208 is associated, and for descriptive purposes, respective reference numbers 204A and 208A may be used to reflect the "associated" state of that particular respective data buffer 204A and that particular descriptor buffer 208A. Thus, the value 230g identifies the data buffer 204A as a particular data buffer that is associated with a particular descriptor buffer 208A. It is to be understood that this association between the two particular buffers 204A and 208A may be said to be "exclusive" in that no other data buffer 204 is associated at the same time with that associated descriptor buffer 208A, and no other descriptor buffer 208 is associated at the same time with that associated particular data buffer 204A.

It is permissible for any particular descriptor buffer 208 to not be associated with any data buffer 204 for a given time. However, each particular data buffer 204 must be associated with one particular descriptor buffer 208 at all times in the life of the buffer cache 214, although there may be a change in the identity of the one particular descriptor buffer 208 with which that particular data buffer 204 is associated. Thus, any one particular data buffer 204 may dissociate (or become dissociated) from a particular descriptor buffer 208 (e.g., 208-1) and immediately after such dissociation, another (i.e., different) particular descriptor buffer (e.g., 208-2) will become associated with that particular one data buffer 204. Such dissociation may be described as "breaking" an association, or "terminating" such association, for example. Oppositely, and without the advantages of the present invention, the system described with respect to FIGS. 1A and 1B does not have such a NULL pointer capability (e.g., of a link value 230g) because the two members of the pair 106 (i.e., the data buffer 104 and the associated descriptor buffer 105) are permanently paired. In detail, the address pointer of that permanently paired descriptor buffer 208 is always constant and "NON-NULL", so as to always point to that permanently paired associated data buffer 204 corresponding to that particular descriptor buffer 208, and the value 230g is always present to designate the size and address of that particular data buffer 204 with which that particular descriptor buffer 208 is permanently paired. In respect to FIGS. 1A and 1B, "always" refers to during the life of the buffer cache.

Another link value 230h of the descriptor buffer 208 relates to whether the data buffer is "valid". Two associated buffers (e.g., a particular descriptor buffer 208A and a particular data buffer 204A that are associated) are "valid" when that particular data buffer 204 contains valid data for the file ID and offset that are identified in the link value 230a of that associated particular descriptor buffer 208. In terms of the value 230h, the contents of the particular data buffer 204 are said to be "not valid", for example, until the data corresponding to a new DAR arrives and is written into that particular data buffer 204 from the disk 240D. Thus, subsequent DAR for the same data (represented by the file ID and offset) must wait for that data to arrive and be written into the data buffer, and for the link value 230h to be changed to valid.

With this in mind, it may be understood that in the present invention, for this address pointer, the link value 230g may represent NULL or NON-NULL independently of the free state, and independently of the not-free state, of each particular data buffer 204 and of each particular descriptor buffer 208. For example, referring to FIG. 2A at the lower end of the buffer cache 214, the independence of the address pointer setting (or address to which the address pointer points) from the free/not free state allows an associated particular data buffer 204A to be placed in (linked to) the free data buffer list 202 (arrow 210F) apart from (independently of) the particular descriptor buffer 208A. Such placing of that particular data buffer 204A is done without losing the association of that particular data buffer (now referred to as 204AF when in the free data buffer list 202) with the corresponding particular descriptor buffer 208A. This association continues because it is not necessary to change the link value 230g when the particular data buffer 204A is so freed. As noted above, that association as particular data buffer 204A and particular descriptor buffer 208A that are not free is schematically indicated by dashed line 218. The still-associated particular free buffers are respectively referred to as 204AF and 208AF and the continuing association is indicated by the dashed line 218F. However, because the link value 230g of the address pointer of the particular descriptor buffer 208 may represent NULL or NON-NULL independently of the free/not-free state of each of the respective particular data buffer 204 and the descriptor buffer 208, as described below, in the present invention two associated particular data buffer 204 and particular descriptor buffer 208 may become "formerly-associated" (i.e., become "dissociated"), in which event at least the particular dissociated data buffer 204, if not the particular descriptor buffer 208, will become associated with a different respective particular descriptor buffer 208 and particular data buffer 204.

Configuration of Free Buffer Lists 202 and 206

Although the buffer cache 214 may configure various types of lists for each of the free data buffer list 202 and the free descriptor buffer list 206, the buffer cache 214 of a preferred embodiment configures each list 202 and 206 as a link list. The respective link lists 202 and 206 include a list linking the respective free data buffers 204AF and another separate list linking the free descriptor buffers 208F. With respect to each particular free data buffer 204AF, the free data buffer link list 202 includes (is implemented by) two link values 230i of the descriptor 230 of that particular descriptor buffer 208A with which that particular free data buffer 204AF is associated. Those two link values 230i are described in Table I, which identifies exemplary various values 230a through 230n of the descriptor 230 of that one particular descriptor buffer 208A. That one particular descriptor buffer 208A may or may not also be free (i.e., be identified as "AF"), but it is referred to as "208A" to indicate the association with the particular data buffer 204AF. With respect to each particular free descriptor buffer 208F, and separately from any association of that particular free descriptor buffer 208, the free descriptor buffer link list 206 includes (is implemented by) two link values 230j of the descriptor 230 of that free descriptor buffer 208F. The two link values 230j are described in Table I, and below.

Link List Header 231

Figure 2B:
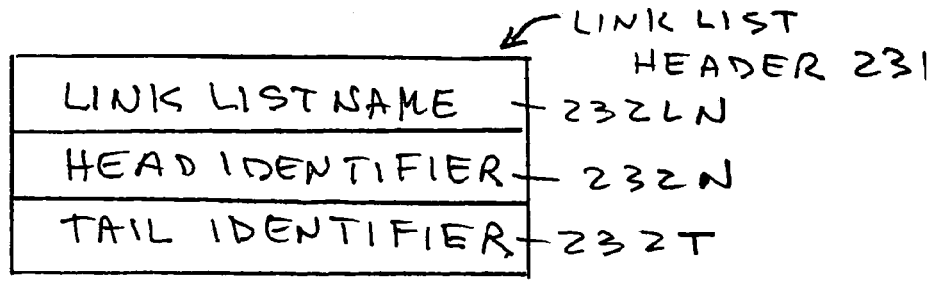
FIG. 2B is a schematic diagram illustrating one of the free buffer lists as including a list header configured to identify the free buffer list, a head identifier, and a tail identifier.

A first aspect of each link list 202 and 206 is shown in FIG. 2B, illustrating a list header, or link list header, 231. Each of the free data buffer link list 202 and the free descriptor buffer link list 206 is configured with such a link list header 231. This list header 231 is configured to identify each of the following items (1), (2), and (3). Item (1) is the link list name, e.g., the "free data buffer list 202" (or for the other header 231, that name is of the "free descriptor buffer list 206", see link list name 232LN). Item (2) is a head identifier 232H. For the free data buffer link list 202, the corresponding head identifier 232H identifies the particular free data buffer 204AF that is at the Least Recently Used (LRU) end, or head, of the free data buffer list 202. That identification is by an address pointer to a particular free descriptor buffer 208AF that is associated with that particular free data buffer 204AF, i.e., the one particular free data buffer 204AF that is at the LRU end, or head, of the free data buffer list 202. For the free descriptor buffer 208F, the corresponding head identifier 232H identifies the particular free descriptor buffer 208F that is at the LRU end, or head, of the free descriptor buffer list 202. That corresponding head identifier 232H is an address pointer to that particular free descriptor buffer 208AF, i.e., the one at the LRU end, or head, of the free data buffer list 202. Item (3) is a tail identifier 232T. For the free data buffer link list 202, the corresponding tail identifier 232T identifies the particular free data buffer 204AF that is at the Most Recently Used (MRU) end, or tail, of the free data buffer list 202. That identification is by an address pointer to a particular free descriptor buffer 208AF that is associated with that particular free data buffer 204AF, i.e., the one 204AF that is at the MRU end (tail), of the free data buffer list 202. For the free descriptor buffer 208F, the corresponding tail identifier 232T identifies the particular free descriptor buffer 208F that is at the MRU end (tail) of the free descriptor buffer list 206. That tail identifier 232H is an address pointer to that particular free descriptor buffer 208AF, i.e., the one 208AF at the MRU end (tail) of the free descriptor buffer list 206.

Link List Values 230i

Figures 1, 2C:
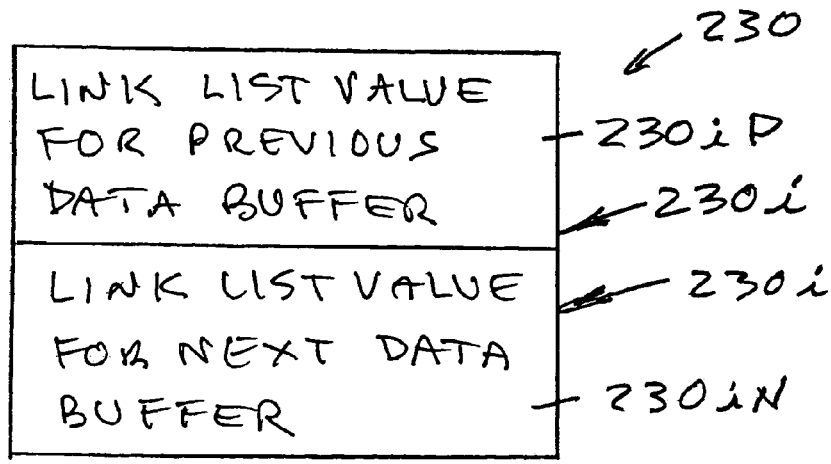
FIG. 2C-1 is a schematic diagram illustrating the free data buffer list configured with a link list descriptor doubly linked to both a more-recently-used free data buffer and to a less-recently-used free data buffer.

A last aspect of each link list 202 is shown in FIG. 2C-1, which schematically illustrates a link list value diagram for an exemplary one of the free buffer link lists, e.g., the free data buffer link list 202. As background, reference is made to FIG. 2A in which many free data buffers (e.g., 204AF) are shown in the data buffer list 202, and each is labeled with a sequence number, such as 1, 2, 3, N. The sequence numbers 1 through N indicate the order in which the free data buffers 204AF appear on the free data buffer link list 202. As described above, the placing (or linking) of a free data buffer 204AF enters that free data buffer on the free data buffer link list 202 at the tail (MRU) end. The exemplary last free data buffer 204AF to be so placed is the N free data buffer 204AF. To take a free data buffer 204AF off (unlink from) the free data buffer list 202, an exemplary #1 free data buffer 204AF may be taken from the LRU (or head) end of the free data buffer list 202, or may be taken from anywhere on the free data buffer list 202, according to the situation, as described below. The buffer cache 214 is configured with the link list header 231, with each particular descriptor buffer 208 that is associated with the particular data buffer 204 having link list values corresponding to the link list value diagram shown in FIG. 2C-1. In this manner, via that associated descriptor buffer 208A and the value 230i of the descriptor 230 of that associated descriptor buffer 208A, the free data buffer link list 202 accounts for, or keeps track of, a free data buffer 204AF being taken from the head end, or from anywhere else on the free data buffer link list 202, and accounts for a free data buffer 204AF being placed on (linked to) the free data buffer link list 202. Such value 230i thus identifies a data buffer 204F that is on the free data buffer list 202. To reduce the description, only the use of a corresponding link list value diagram (FIG. 2C-2) for the descriptor buffer 208 is described in detail (see link list value 230i).

Link List Values 230i

Figures 2, 2C:
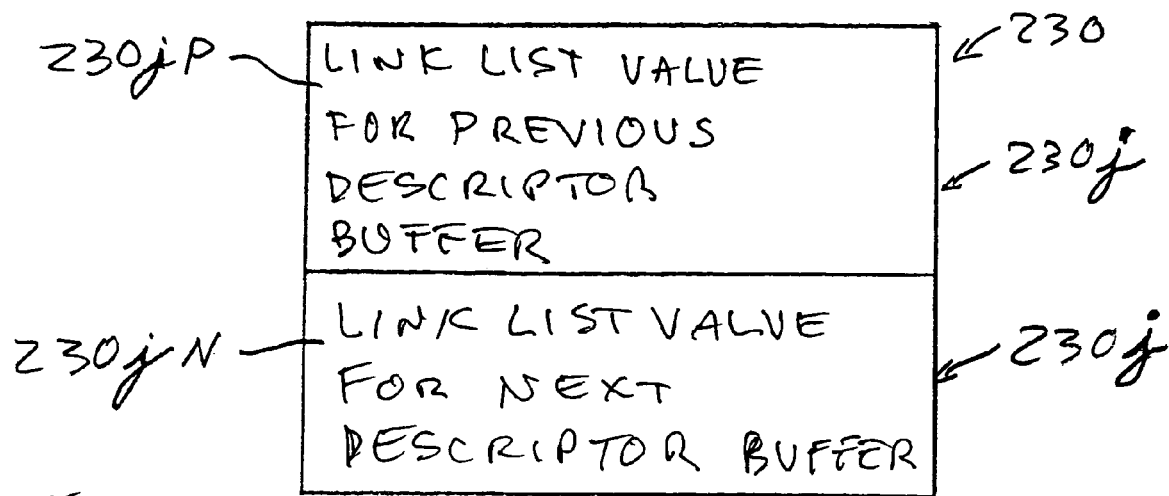

A last aspect of each link list is shown in FIG. 2C-2, which schematically illustrates the link list value diagram for an exemplary one of the free descriptor buffer link lists 206. Reference is again made to FIG. 2A and an exemplary one of the free descriptor buffers 208, e.g., the #4 free descriptor buffer 208AF that is shown associated with the #2 data buffer 204AF. Because this exemplary #4 free descriptor buffer 208AF is not at the head or the tail of the free descriptor buffer list 206, it will not be identified in the link list header 231 (FIG. 2B) that corresponds to this #4 free descriptor buffer 208AF. The buffer cache 214, and the exemplary #4 free descriptor buffer 208AF, are further configured with respect to positioning of the #4 free descriptor buffer 208AF on the free descriptor data buffer link list 206 as follows. The positioning on the free descriptor buffer link list 206 of that exemplary #4 free descriptor buffer 206AF is indicated by way of link values 230*j* (Table I) of the descriptor 230 of that particular #4 free descriptor buffer 208AF. FIG. 2C-2 shows a link list value diagram which illustrates the details of those two link values 230*j*, one identified as 230*j*P and the other as 230*j*N. These two link values 230*j*P and 230*j*N represent a double linking of that one free descriptor buffer 208AF to two other ones of the free descriptor buffers 208AF that are also on the same free descriptor buffer link list 206 at the same time as the exemplary #4 free descriptor buffer 208AF is on such free descriptor buffer link list 206. Referring to FIG. 2A again, the link value 230*j*N (FIG. 2C-2) identifies one such linked free descriptor buffer (e.g., #5) which is a "next" descriptor buffer 208AF "down" the free descriptor buffer link list 206 (toward the tail). That identification of the exemplary #5 data buffer is by an address pointer to that particular #5 free descriptor buffer 208AF. Still referring to FIGS. 2A and 2C-2, the link value 230*j*P (FIG. 2C-2) identifies the other such linked free descriptor buffer (e.g., #3) which is a previous descriptor buffer 208AF "up" the free descriptor buffer link list 206 (toward the head). That identification of the exemplary #3 descriptor buffer is by an address pointer to that particular #3 free descriptor buffer 208AF. In each case, the "up" or "down", or respective "previous" or "next", are relative to the position of the particular #4 free descriptor buffer 208AF. This completes the links to the up and down free descriptor buffers 208AF relative to the exemplary #4 free descriptor buffer 208AF. In a similar manner, the buffer cache 214 is configured with the descriptor buffer link list 206, including other each other free descriptor buffer 208AF having link list values 230*j*P and 230*j*N representing the links to the respective up and down free descriptor buffers 208AF relative to that other exemplary free descriptor buffer 208AF.

With this above description in mind, it may be understood that link values 230*i*P and 230*i*N of that #4 free associated descriptor buffer 208AF account in a similar manner for the positioning of the associated #2 data buffer 204AF on the free data buffer list 202.

Changes in Status of Free Buffers 204 and 208

As the buffer cache 214 is used, there may be a change in the status of the data buffers 204 and/or the descriptor buffers 208. The status may relate to whether or not the data buffer 204 or one descriptor buffer 208 is free, which relates to the respective link list 202 or 206. For example, a status change may involve respective free data buffers 204AF that are adjacent on the list 202, or involve respective free descriptor buffers 208 that are adjacent on the list 206. Another example is that the status change may result from any one of three exemplary situations in the operation of the buffer cache 214. First, a not-free data buffer 204 or a not-free descriptor buffer 208 may become free by being placed on (linked to) the respective free buffer list 202 or 206, which is a linking to the tail of the respective link list. Second, the change in status may result from a free data buffer 204AF or free descriptor buffer 208AF being taken off (unlinked from) the head of the respective free data buffer link list 202 or the head of the free descriptor buffer link list 206. Third, a free data buffer 204AF or free descriptor buffer 208AF may be taken off (unlinked from) the middle of the respective free data buffer link list 202 or the respective free descriptor buffer link list 206, which middle may be anywhere between the head and the tail. Thus, the configuring of the buffer cache 214 allows the taking of the descriptor buffer 208AF from any of the positions on the free descriptor buffer list 206.

To account for such changes in status, standard linking techniques may be used. These linking techniques may be used with the buffer cache 214 configured according to the present invention to reflect such status changes. Such configured buffer cache 214 may change the link values 230*i* and 230*j* of all of the buffers 204AF or 208F or 208AF that are involved with such status changes, and may change values in the link list header 231. Such status changes may be referred to as "changing the linking", which may include "linking" one buffer 204 or 208 to its respective link list 202 or 206, or "unlinking" one buffer 204 or 208 from its respective link list 202 or 206.

Linking To Tail

The first status change (Linking To Tail) is a situation in which a data buffer 204 or a descriptor buffer 208 may become placed on (linked to) the tail of respective free buffer list 204 or 208. Linking To Tail involves three exemplary linking changes, which are referred to as 1A, 1B, and 1C (which identifications are not shown in the Figures). Once the Linking to Tail is performed, these respective newly-linked free buffers are referred to as "204AF" and "208AF" to conform to those free buffers shown in FIG. 2A as being "on" the respective link list 202 or 206. In reference to FIG. 2A, the Linking To Tail is described with respect to the #N buffers 204AF and 208AF becoming linked as indicated by respective solid line 210F and dashed line 212F. The linking change 1A (referred to as a "Change Tail Identifier") is configured by a change to the tail identifier 232T (FIG. 2B) of the link list header 231 of the respective link list 202 or 206 to identify (as the tail) the new seventh #N data buffer 204AF or the new tenth #N descriptor buffer 208AF that is being linked to the tail of the respective link list 202 or 206. This linking change 1A is configured for the free data buffer link list 202 by changing the identifier 232T (of the respective link list header 231 of the free data buffer link list 202) to identify the newly-free, seventh (#N) free data buffer 204AF that is to be linked to the tail of the free data buffer list 202. This linking change 1A is configured for the free descriptor buffer 208F by changing the identifier 232T (of the respective link list header 231 of the free descriptor buffer link list 206) to identify the newly-free, tenth (#N) free descriptor buffer 208F that is to be linked to the tail of the free descriptor buffer link list 202.

Linking change 1B (referred to as a "Change Link List Value For Newly-Linked Buffer") changes the respective link values 230*i* or 230*j* with respect to identifying (linking to) buffers 204AF and 208AF that are "previous" and "next" with respect to the newly-free buffers. Again, FIG. 2A shows the exemplary situation in which currently (before the linking of #N) six free data buffers 204AF were on the free data buffer link list 202. Linking change 1B relates to linking the seventh #N free data buffer 204AF to this link list 202. The corresponding exemplary situation of the descriptor buffer link list 208 is shown, with currently nine free descriptor buffers 208AF and change 1B relates to linking the tenth #N free descriptor buffer 208AF to this link list 206. Standard linking techniques may be used, but in the following manner for the present invention. The newly-linked seventh (#N) free data buffer 204AF is (and has been) associated with the #N descriptor buffer 208AF. The link values 230*i* of that #N descriptor buffer 208AF are currently NULL because the associated seventh (#7) data buffer 204AF is not free until it becomes linked. The linking change 1B changes these NULL link values. For example, respective 230*i*P (FIG. 2C-1) changes from NULL (indicating no "previous" free data buffer) to a linking to the now-previous #6 free data buffer 204AF; and respective 230*i*N (FIG. 2C-1) changes from NULL to a linking to the link list header 231 (to the tail identifier 232T). Further, to configure newly-linked tenth (#N) descriptor buffer 208AF the respective 230*j*P (FIG. 2C-2) is changed from NULL (which indicated no "previous" free descriptor buffer) to a linking to the now-previous #9 free descriptor buffer 208AF. Thus, respective descriptor value 230*j*N changes from NULL to a linking to the link list header 231 (to the tail identifier 232T).

Linking change 1C (referred to as a "Change Link List Value For Former Tail Buffer") changes the link value 230*i*N of the respective #9 associated descriptor buffer 208A that is associated with the #6 data buffer 204AF. The #6 data buffer 204AF is shown as the former tail buffer in FIG. 2A (before the seventh #N data buffer was linked). Thus, this link value 230*i*N currently (before the new linking) identified a linking of the #6 free data buffer 204AF to the link list header 231 (i.e., to the tail identifier 232T) because the #6 free data buffer 204AF was then at the tail of the link list 202. This link value 230*i*N is configured by a change to identify the newly-linked seventh #N data buffer 204AF as the "next" data buffer relative to the #6 data buffer 204AF. This change is implemented by a change of the link value 230*i*N of the respective associated #9 descriptor buffer 208A. Also, this linking change 1C is done for the #9 descriptor buffer 208F by changing the link value 230*j*N of the descriptor 230 of that #9 descriptor buffer 208AF to identify the newly-free #N free descriptor buffer 208AF, which is now next below the #9 descriptor buffer 208AF.

In view of this linking to tail description, it may be understood that the buffer cache 214 is configured to place any data buffer 204 on the separate free data buffer list 202 according to the state of completion of processing of that data buffer 204, and that the buffer cache is further configured to place any descriptor buffer 208 on the free descriptor buffer list 206 according to the state of completion of processing of that descriptor buffer 208.

Unlinking From Head of Lists 202 and 206

The second status change ("Unlink From Head") is a situation in which a data buffer 204AF or descriptor buffer 208AF may be taken off (unlinked from) the head of the respective free buffer list 204 or 208. Unlinking From Head of Lists involves three exemplary linking changes, which are referred to as 2A, 2B, and 2C (which identifications are not shown in the Figures).

In FIG. 2A, this corresponds to the #1 buffers 204AF and 208AF becoming unlinked as indicated by respective lines 210T and 212T. The linking change 2A (referred to as a "Change Head Identifier") is a change to the head identifier 232H of the respective link list header 231 of the respective link list 202 or 206 to identify the new #1 buffer 204AF or 208AF that is to become linked to the head of the respective list. The new #1 buffer 204AF or 208AF is shown as the #2 buffers 204AF and 208AF which become the head buffers once the #1 buffers are unlinked. This linking change 2A is configured for the free data buffer link list 202 by changing the respective identifier 232H to identify that new head (#2) free data buffer 204AF that is now to be linked to the head of the free data buffer link list 202. This linking change 2A is configured for the free descriptor buffer link list 206 by changing the respective identifier 232H to identify that new head (#2) free descriptor buffer 208F that is now to be linked to the head of the free descriptor buffer link list 202.

Linking change 2B (referred to as a "Change Link List Value For Newly-Unlinked Buffer") changes a link value 230*i*N of each the respective (exemplary #1) buffers 204AF and 208AF that is to become unlinked. Standard linking techniques may be used in the following manner for this invention. The newly unlinked #1 data buffer 204AF is associated with the #1 descriptor buffer 208AF. The link value 230*i*N (FIG. 2C-1) of this #1 descriptor buffer 208AF is changed by configuring to NULL to indicate that the associated unlinked #1 data buffer 204A has no "next" data buffer. This linking change 2B is also configured for the newly unlinked #1 descriptor buffer 208F by changing (to NULL) the link value 230*j*N (FIG. 2C-2) of the descriptor 230 of that newly-free #1 descriptor buffer 208AF.

Linking change 2C (referred to as a "Change Link List Value For New Head Buffer") changes the link value 230*i*P (FIG. 2C-1) of the respective #2 associated descriptor buffer (FIG. 2C-1) of the respective #2 associated descriptor buffer 208AF that is associated with the #2 data buffer 204AF. As described, each of these #2 buffers is now at the head of the respective link list 202 and 206. This link value 230*i*P currently (before the new unlinking) identified a linking of the #2 free data buffer 204AF to the #1 free data buffer 204AF (via the associated #1 descriptor buffer 208AF). Now that link list value 230*i*P is configured to identify the free data buffer link list header 231 (link to the head identifier 232H) because the #2 free data buffer is now at the head of the link list 202. This linking change 2C is configured for the #2 descriptor buffer 208F by changing the link value 230*j*P (FIG. 2C-2) of the descriptor 230 of the #2 descriptor buffer 208AF to link to the descriptor buffer link list header 231 (link to the head identifier 232H).

Unlinking from Middle of Lists 202 and 206

The third status change (Unlinking From Middle) is a situation in which a data buffer 204 or descriptor buffer 208 may be taken off (unlinked from) the middle of the respective free buffer list 204 or 208. This third status change is illustrated by exemplary unlinking of the #4 free data buffer 204AF from the free data buffer link list 202 (shown by another line 210T), and an exemplary unlinking of the #5 descriptor buffer 208AF (which is shown associated with that #4 data buffer 204AF in order to require this unlinking from the middle). Unlinking From Middle involves three exemplary linking changes, which are referred to as 3A, 3B, and 3C (which identifications are not shown in the Figures). There is no change in the link list header 231 because the head and tail of the respective lists 202 and 206 stay the same in this situation.

Linking change 3A (referred to as a "Change Link List Values For Newly-Unlinked Buffer") changes the respective link values 230*i* or 230*j* of the respective buffer 204A or 208A that is to become unlinked. Standard linking techniques may be used in the following manner for the present invention. The link values 230*i*P and 230*i*N (FIG. 2C-1) of that #5 descriptor buffer 208AF are configured by a change to NULL to indicate that the newly unlinked #4 data buffer 204AF has no previous or next data buffers. This linking change 3A is also configured for the newly unlinked #5 descriptor buffer 208F by changing (to NULL) the link values 230jP and 230jN (FIG. 2C-2) of the descriptor 230 of that newly-free #5 descriptor buffer 208AF.

Linking change 3B (referred to as a "Change Link List Value For Former Next Buffer") changes the link value 230iP (FIG. 2C-1) of the respective #8 associated descriptor buffer 208AF that is associated with the #5 data buffer 204AF. This link value 230iP currently (before the new unlinking) identified a linking of the #5 free data buffer 204AF to the #4 free data buffer 204AF, with the #4 buffer being "previous" to the #5 buffer. Now that configured link list value 230iP of the #8 descriptor buffer 208AF identifies the #3 free descriptor buffer 208AF with which the (now "previous") #3 data buffer 204AF is shown associated. Thus, the #5 data buffer 204AF is now linked to the previous #3 data buffer 204AF via the value 230iP of the #8 descriptor buffer 208AF. This linking change 3B is also configured for the link value 230jP (FIG. 2C-2) for the #6 descriptor buffer 208F by changing the link value 230jP of the descriptor 230 of the #6 descriptor buffer 208AF to link to the #4 descriptor buffer 208AF, which is now previous to that #6 descriptor buffer 208AF.

Linking change 3C (referred to as a "Change Link List Value For Former Previous Buffer") changes the link value 230iN of the respective #3 associated descriptor buffer 208AF that is associated with the #3 data buffer 204AF. This link value 230iN currently (before the new unlinking) identified a linking of the #3 free data buffer 204AF to the #4 free data buffer 204AF (via the associated #3 descriptor buffer 208AF), and now that link list value 230iN identifies the #8 free descriptor buffer 208AF with which the (new next) #5 data buffer 204AF is associated. Thus, the #3 data buffer 204AF is now linked to the new next #5 data buffer 204AF. This linking change 3B is configured for the #4 descriptor buffer 208AF by changing the link value 230jN (FIG. 2C-2) of the descriptor 230 of that #4 descriptor buffer 208AF to link to the new next #6 descriptor buffer 208AF, which is now "next" since the #5 descriptor buffer 208AF has been unlinked.

In a general sense, as part of processing of a data access request, the data to be accessed is stored (or held) in the buffer cache pool 216, e.g., in one of the data buffers 204 of the buffer cache 214. The present invention may be used with various types of buffer caches, such as content addressable memory systems, for example. A preferred embodiment of the present invention is described in connection with an exemplary array storage system 250 (FIGS. 4 and 5) that uses the data held in the buffer cache pool 216 to complete a fault recovery operation. Such operation, for example, assures that both the data and parity are seen (confirmed) as being written, or neither written, for the fault tolerance purpose. In connection with the use of the system 250, completion of the fault recovery operation with efficient use of the buffer cache pool 216 is achieved as follows.

Initialization

Figure 2D:
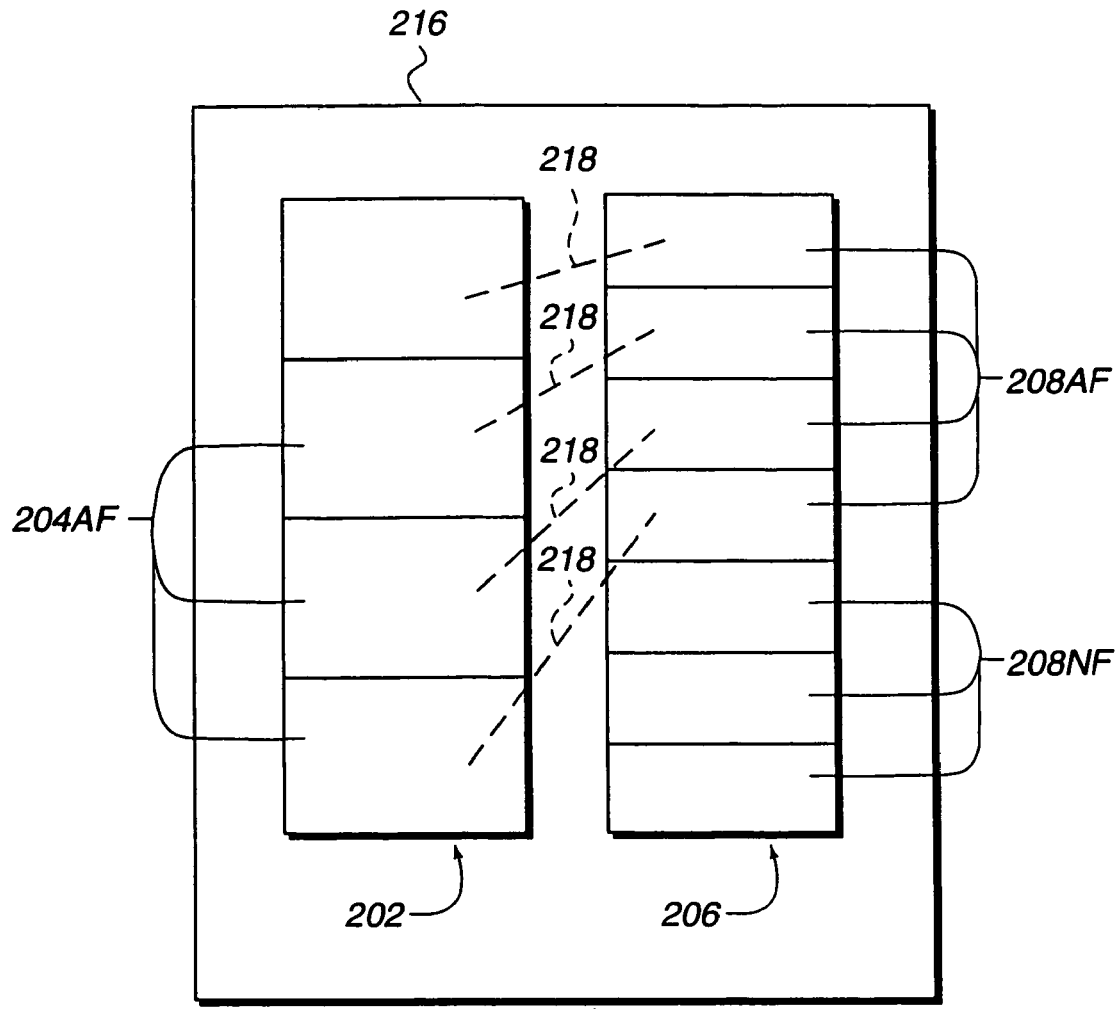
FIG. 2D is a schematic diagram illustrating that on initialization, the separate respective free buffer lists are configured with free data buffers and free descriptor buffers that are associated, and the free descriptor buffer also with a plurality of free unassociated descriptor buffers.

FIG. 2D shows an aspect of the configuration of the buffer cache pool 216 at initialization of the system 250. Initialization is a situation in which there was no previous attempt to access any specific files of the system 250. Thus, no data is at that time stored in any of the data buffers 204, and none are shown separately from the free data buffer list 202. On initialization of the system 250, the free link lists 202 and 206 are configured. For example, at least one set of pre-assigned free data buffer 204AF and free descriptor buffer 208AF is placed in the respective link lists 202 and 206 in association with each other. As may be desired, more sets of a pre-assigned free data buffer 204AF and a free descriptor buffer 208AF may be placed in the respective link lists 202 and 206 in association with each other. The pre-assigning enables caching operations to begin. These pre-assigned associations are indicated schematically by the many dashed lines 218. Unassociated free descriptor buffers 208NF may also be placed on the free link list 206. The number of such unassociated free descriptor buffers 208NF is selected to provide adequate unassociated free descriptor buffers 208NF for new association with the free data buffers 204F in the operation of the buffer cache 214. In each case of association, the link value 230g of the descriptor 230 of the associated descriptor buffer 206A includes an address pointer from that descriptor buffer 208 to an associated particular data buffer 204 to indicate association. A NULL value 230g is provided in such unassociated descriptor buffers 208NF.

Within each particular descriptor buffer 208AF that is so associated on initialization, the link value 230g (Table I) designates the address and size of one particular data buffer 204AF with which that particular descriptor buffer 208AF is associated. This value 230g includes the pointer from that particular descriptor buffer 208AF to the address of the associated particular data buffer 204AF. This value 230g is changed from NULL to NON-NULL to indicate the new (on initialization) configuration, which results in the association of that particular data buffer 204AF corresponding to that particular descriptor buffer 208AF. The respective reference numbers 204A and 208A indicate the associated state of that respective particular data buffer 204A and that particular descriptor buffer 208A. Since no process requires this data buffer 204A at the time of initialization, the value 230m is zero counts, and the value 230d will be NOT DIRTY. When these buffers are also free, reference to such free associated buffers again uses the designations 204AF and 208AF, respectively. Thus, the designation of the address and size and association of that particular data buffer 204AF is made in that particular associated descriptor buffer 208AF by its link value 230g indicating size and pointing to the address of that particular data buffer 204AF. Disk space (in the disk 240D or parity 240P) is not pre-allocated, but is allocated as needed, for example when a new block of a file is written into the disk 240D that has never been written before, and when such block is to be written into the particular data buffer 208AF. As noted, to assure adequate access to descriptor buffers 208 following initialization, on initialization the buffer cache pool 216 may also be configured with the additional pre-assigned dissociated (or unassociated) descriptor buffers 208NF. These descriptor buffers 208NF have a value 230g with a NULL pointer, and are shown placed on the free descriptor buffer list 206.

New Data Access Request (DAR)

Figure 2E:
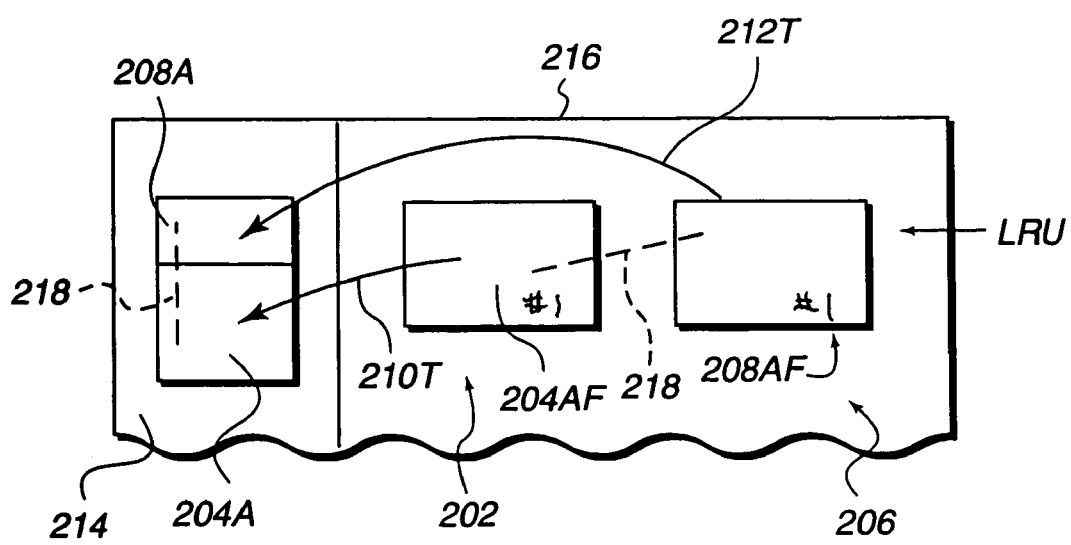
FIG. 2E is a schematic diagram illustrating that just after initialization, a respective free data buffer and a respective free descriptor buffer that are associated may each be taken from a LRU end of each respective free buffer list in response to a new data access request.

As described above, the link value 230a designates a specific file ID and file offset. FIG. 2E schematically shows the buffer cache 214 responding to a new DAR, which is a DAR in which there was no previous attempt to access such a specific file. This new DAR may occur just after initialization, such as upon receipt of an "initial" DAR to access such a specific file. A method of validating a particular data buffer 204 for use in response to the new DAR is performed, so that the data corresponding to this initial DAR will be stored in that data buffer 204, and such data will correspond to the file ID and offset of a particular descriptor buffer that is associated with that particular data buffer 204. Generally, in validating the data buffer 204, FIG. 2E schematically shows that the particular descriptor buffer 208AF may be unlinked (arrow 212T) from the LRU end of the free descriptor buffer link list 206 and placed in the buffer cache 214 as the descriptor buffer 208A. Similarly, the associated particular data buffer 204AF may be unlinked (arrow 210T) from the LRU end of the free data buffer link list 202 and placed in the buffer cache 214 as the data buffer 204A. In each case, the "A" designations signify associated. The left dashed line 218 indicates the continued association of buffers 204A and 208A.

Figure 3A:
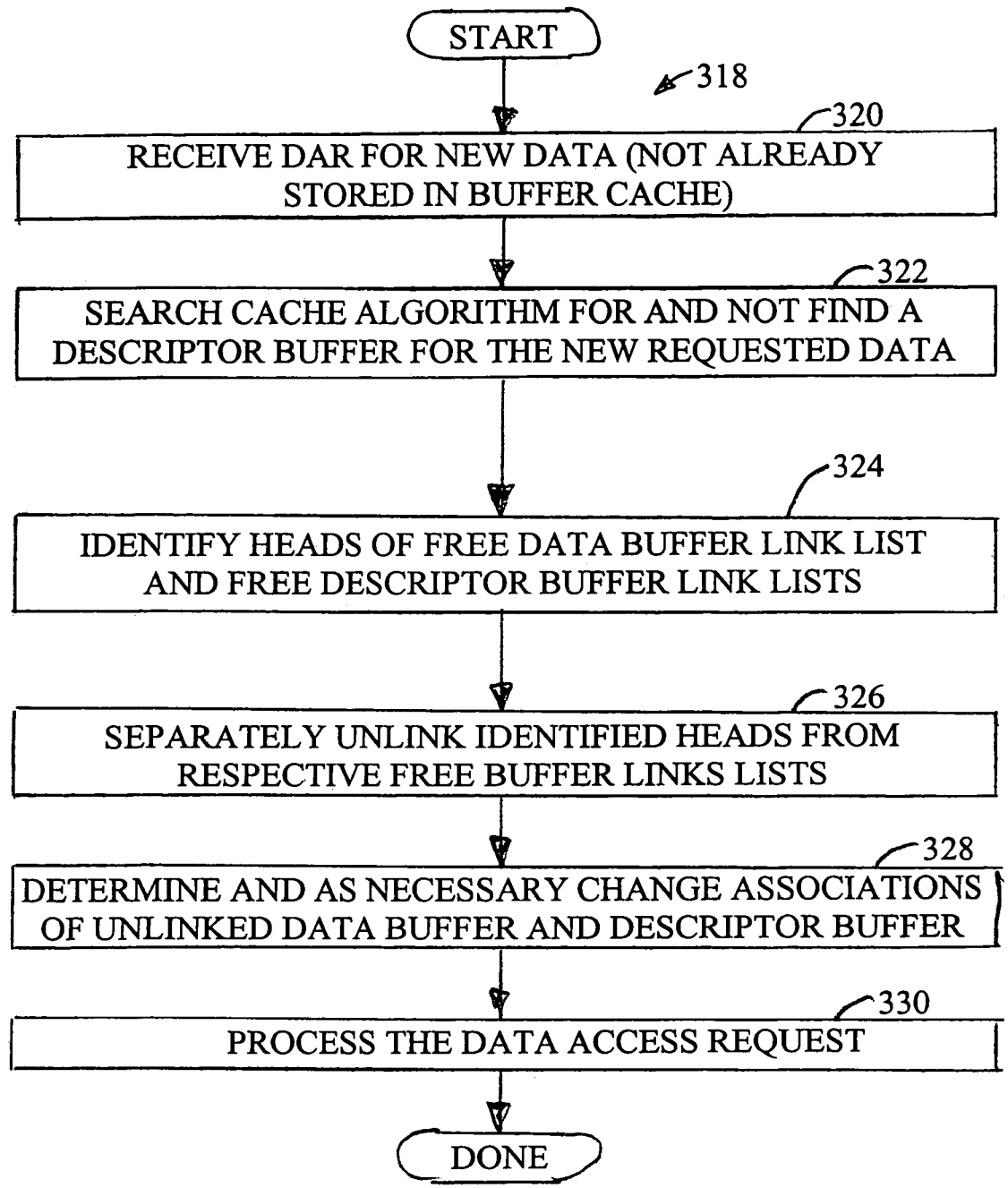
FIGS. 3A through 3E illustrate flow charts of methods of the present invention by which a buffer cache is configured for efficient buffer cache utilization.

FIG. 3A describes a flow chart 318 which includes an operation 320 of receiving the DAR for the new data. The method moves to an operation 322 of responding to this DAR by a search cache algorithm searching to find a descriptor buffer 208 corresponding to the new DAR. This descriptor buffer 208 is not found because the data is not already stored in the buffer cache 214. The method moves to an operation 324 in which reference is made to the link list header 231 (FIG. 2B) of the free descriptor link list 206 to determine what descriptor buffer 208F is at the head of the link list 206. Link list identifier 232H is referred to in making this determination and the #1 descriptor buffer 208AF is identified. Similarly, as to the data buffer link list 202, the corresponding link list identifier 232H is referred to in making this determination for the data buffers 204, and the #1 data buffer 204F is identified. The method then moves to an operation 326 in which the #1 descriptor buffer 208AF (FIG. 2E) is unlinked from the LRU end of the free descriptor buffer link list 206 (see arrow 212T) and placed in the buffer cache 214 as the descriptor buffer 208A. In operation 326, the #1 data buffer 204F is also unlinked from the LRU end of the free data buffer link list 202 and placed in the buffer cache 214 as the data buffer 204A. Thus, there is separate unlinking of the respective data buffer 204AF and descriptor buffer 208AF from the respective link lists 202 and 208.

The method moves to operation 328, in which the current associations of the #1 data buffer 204AF and #1 descriptor buffer 208AF are determined. In operation 328, the #1 data buffer 204AF and the #1 descriptor buffer 208AF are found to be associated with each other because the initialization has previously associated those #1 free data buffer and #1 free descriptor buffer. An operation 330 then completes the processing of the DAR. This includes hashing the file ID and file offset of such specific file of the new DAR. The hashing creates a hash value which identifies a hash bucket corresponding to the newly-unlinked #1 descriptor buffer 208A. With these unlinking and the hashing, the descriptor buffer 208A is then populated, which is to say that the appropriate link values 230a through 230n are entered into the descriptor 230 of that particular descriptor buffer 208A for the new DAR. As examples, the file ID and file offset are entered into value 230a. The hash values are entered into value 230b. The data is then read from the disk 240D into the associated particular data buffer 204A and made valid (descriptor 230 value 230h). Once validating of that particular data buffer 204A has been completed to store the data corresponding to the new DAR, and once the descriptor 230 of the particular associated descriptor buffer 208A so indicates, the word "old" may be used to refer to both the particular data buffer 204A that is associated with the particular descriptor buffer 208A, and to that particular descriptor buffer 208A for that data that was just read from the disk 240D into that associated particular data buffer 204A. "old" may also refer to that data in that particular data buffer 204A. As the first of the old data, this old data may be referred to as "first old data". The data in the particular data buffer 204A may then be processed and the particular descriptor buffer 208A may be processed, and the method is done.

Second New DAR

It may be understood that another new DAR situation may later occur, and may relate to a new attempt to access a specific file other than that of the above first old data. In this situation, there is a process the same as the above-described process that occurred just after initialization. This process results in the new specific file stored in another (or new) particular data buffer 204A in association with another (or new) particular descriptor buffer 208A. Thus, second "old" data is cached in the buffer cache 214 in this new data particular buffer 204A. Thus, later DARs may be for more new data, or for old data such as the first or second old data.

Configuring Buffer Cache 214: Separate Linkings to Separate Link Lists 202 and 206

Figure 3B:
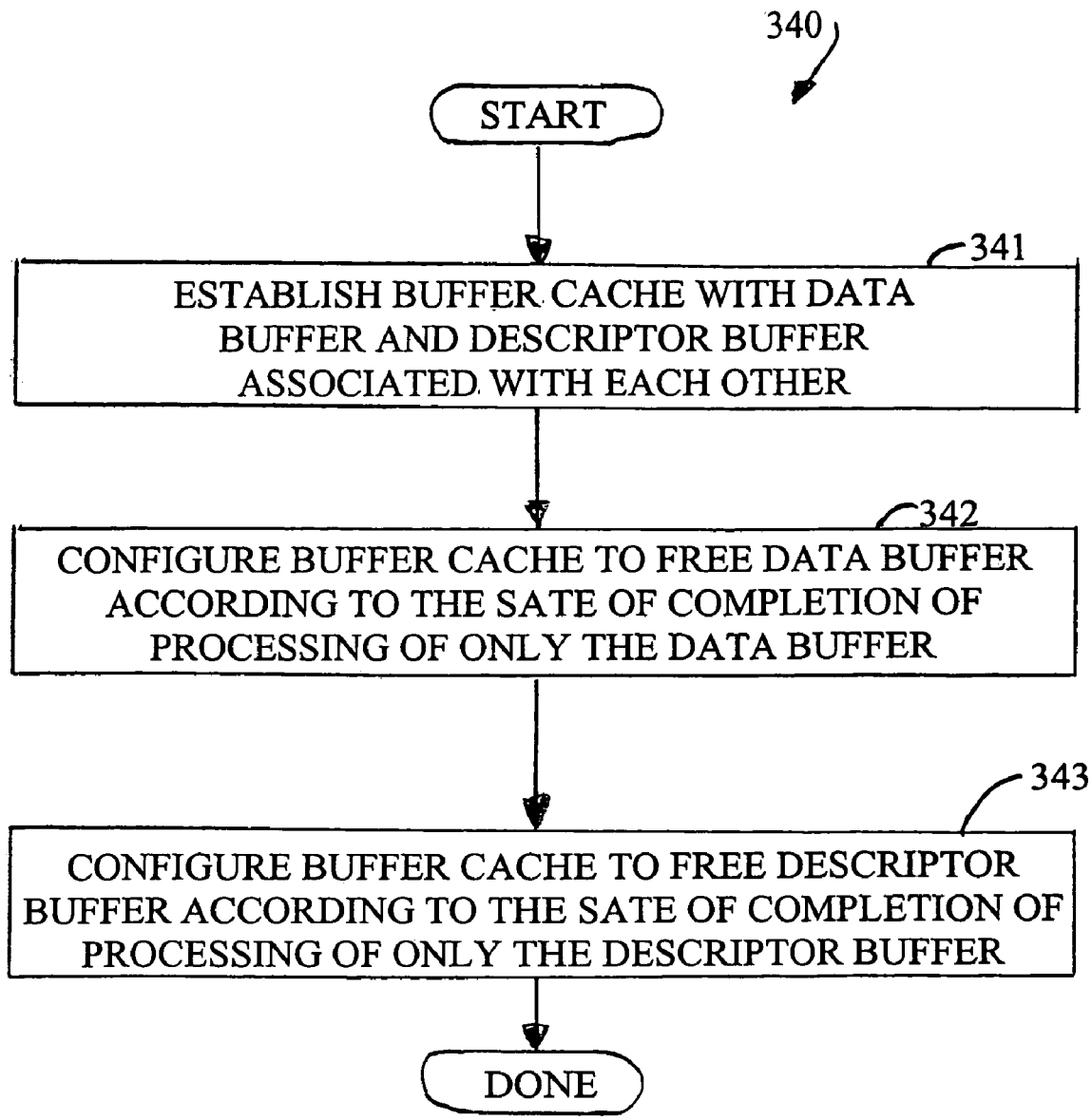

The architecture 200 is configured to respond to a next (or second) DAR for the first old data ("old data"), e.g., old data that is stored in the associated particular data buffer 204A and the particular descriptor buffer 208A. Such second DAR may be referred to as an update request, and is a request to access the specific file of the "first" old data, for example. The buffer cache 214 has been properly configured according to the present invention. Such proper configuring of the buffer cache 214 is provided by a method of the present invention. The method is shown in FIG. 3B by a flow chart 340 in which an operation 341 configures the buffer cache with a data buffer 204A and a descriptor buffer 208A in association with each other. These may, for example, be the previously noted old particular data buffer 204A and old particular descriptor buffer 208A, which are "old" in that they were last used to respond to the above-described exemplary first DAR for that "old" data. For ease of description, the phrase "associated old particular" is referred to as "that", e.g., "that" data buffer or descriptor buffer. The method moves to an operation 342 in which the buffer cache 214 is further configured to link that data buffer 204A on the free data buffer link list 202 according to the state of completion of processing of only that data buffer 204A. In this example, in operation 342 that data buffer 204A is linked to the free data buffer link list 202 according to the processing-complete state of only that data buffer 204A. In this example, the original DAR has been processed, at least as indicated by that descriptor buffer 208A having a value 230d of NOT DIRTY and a value 230m of zero counts, which values reflect the "complete" or "processing-complete" state of processing of that data buffer 204A. Because the state of completion of processing of only that data buffer 204A is "complete" (or "processing-complete"), that data buffer 204A is linked to the free data buffer link list 202 (see arrow 210F). In other words, the linking of that data buffer 204A according to the state of completion of processing of only that data buffer 204A means that such linking is independent of the state of processing of that descriptor buffer 208A. Further, the link list 202 is only for, i.e. only links, free data buffers 204AF.

In a further aspect of the method, independently of operation 342, the method may move to an operation 343 in which the buffer cache 214 is further configured. In this example, in operation 303 that descriptor buffer 208AF is linked to the free descriptor buffer link list 206 according to the state of processing of only that associated descriptor buffer 208AF (see dashed arrow 212F). Only when the state of completion of processing of only that descriptor buffer 208AF is "complete" (as indicated by the Table I value 230n being zero counts), that associated descriptor buffer 208AF is linked to the free descriptor buffer link list 206. In other words, this linking of that descriptor buffer 208A according to the state of completion of processing of only that descriptor buffer 208A means that such linking is independent of the data buffer 204A, and is independent of the state of processing of that data buffer 204A. Further, the link list 202 is only for, i.e. only links, free descriptor buffers 208F or 208AF. When that exemplary descriptor buffer 208AF is linked, the configuring operations are done. FIG. 2E shows this exemplary condition or state of the free data buffer link list 202 and of the free descriptor link list 206, in which both that data buffer 204AF and that descriptor buffer 208AF have been linked again to the respective list 202 or 206, and each is shown as #N on the respective list 202 and 206, and the two are still associated (see right dashed line 218F). In the context of these linkings to the respective link lists 202 and 206 the again-freed data buffer 204AF may be again taken for use in the buffer cache 214.

It may be understood that the method of flow chart 340 of FIG. 3B may implement many aspects of the present invention. Included among these are the following. The buffer cache configuring is performed so that data buffer linking, or freeing, is independent of the state of processing of that descriptor buffer 208A. That is, for example, the freeing of that data buffer 204A does not wait for the processing of that descriptor buffer 208A to be in the "complete" state. As a result, this configuring of that buffer cache 214 may be performed to free the data buffer 204A immediately upon the state of processing of that data buffer 204A being the "complete" state. This configuring further may involve an association operation in which the associating of that data buffer 204A and that descriptor buffer 208A with each other is independent of (i.e., separate from) separate operations in which that data buffer 204A is processed and that descriptor buffer 208A is processed. This configuring of the buffer cache 214 may further include an association operation in which the associating of that data buffer 204A and that descriptor buffer 208A with each other is separate from the configuring of the buffer cache 214 to free (unlink) the data buffer 204A according to the state of completion of processing of that data buffer 204A. This configuring of the buffer cache 214 further enables retaining the association of that data buffer 204A and that descriptor buffer 208A while that data buffer 204A is free (i.e., linked to the free data buffer link list 202). Also, for example, this configuring further allows retaining the association of that data buffer 204A and that descriptor buffer 208A whether that descriptor buffer 208A is free (i.e., is linked to the free descriptor buffer link list 206) or is not free. In addition, the association of that data buffer 204A with that descriptor buffer 208A may be terminated independently of the state of processing of that descriptor buffer 208A. In other words, the association may be terminated when that data buffer is free and that descriptor buffer is not free, or when both are free. In each case of termination of that association, the termination is accomplished by a change in the value 230g of the descriptor 230 of that descriptor buffer 208A that is (or was) associated with that data buffer 204A. The change is to NULL.

Third DAR (Update Request) for Old Data

Buffers 204A and 208A Are Free

Figure 3C:
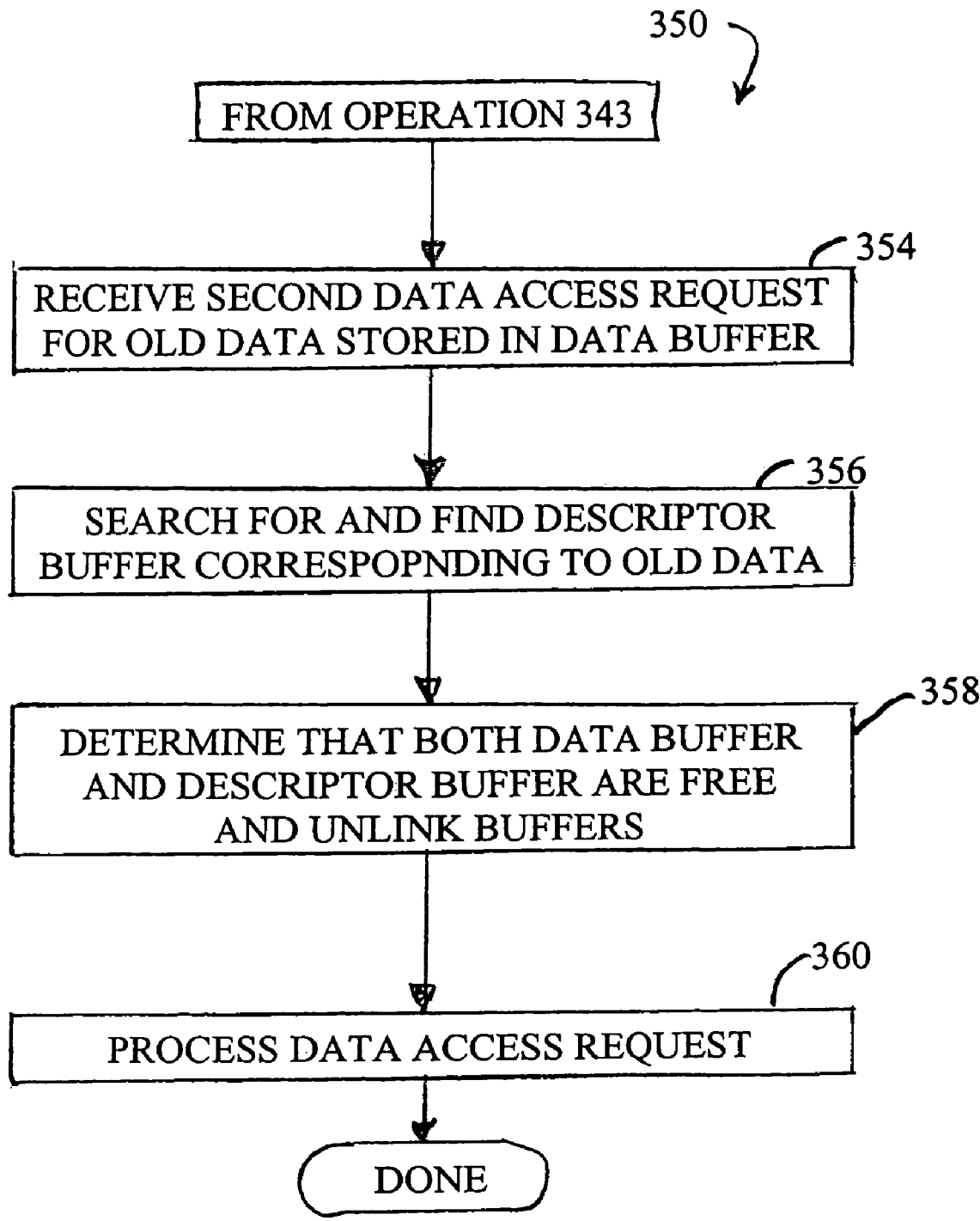

With the configuration of the architecture 200 as described with respect to FIG. 3B, an exemplary status of the cache buffer 214 is shown in FIG. 2E wherein both the #1 data buffer 204AF and the #1 descriptor buffer 208AF are free. For example, this configuration may be after operation 343 of FIG. 3B and is an exemplary status (or state) of the buffer cache 214 upon receipt of the second DAR (update request). FIG. 3C shows a flow chart 350 illustrating a method of the present invention in which the second DAR for old data is processed. The method moves from operation 343 to an operation 354 to receive this update request. Referring to the above description, the hash bucket identifies at least the old associated ("that") descriptor buffer 208AF that is associated with the old associated ("that") data buffer 204AF. That descriptor buffer 208AF corresponds to the first old data as indicated by the descriptor value 230a referring to the file ID and file block of the old data that is stored in that data buffer 204AF. The second DAR requests access to this same block and this same file corresponding to that descriptor buffer 208AF. The method moves to an operation 356 in which the search cache algorithm of operation 322, FIG. 3A is again used to search for and in this example, finds the correct bucket for that descriptor buffer 208AF. Knowing the identification of the bucket, the search is then linear though the bucket, looking for an exact match on the logical block of that descriptor buffer 208AF. When that descriptor buffer 208AF is found in the cache search, its descriptor 230g indicates whether there is a current, or continuing, association between that descriptor buffer 208A and that old data buffer 204A which stores the old data. If so, and if the data is valid (value 230h), the method moves to an operation 358 in which it is determined that the associated free data buffer 204AF and the associated free descriptor buffer 208AF are both free, in which case the buffers are unlinked from the respective list 202 and 206. The method moves to an operation 360 in which the data stored in the associated data buffer 204A are used to satisfy the second DAR, and the method is done. Such use may be to read the data stored in the data buffer 204A, or to write that data to the disk 240D, for example.

Figure 3D:
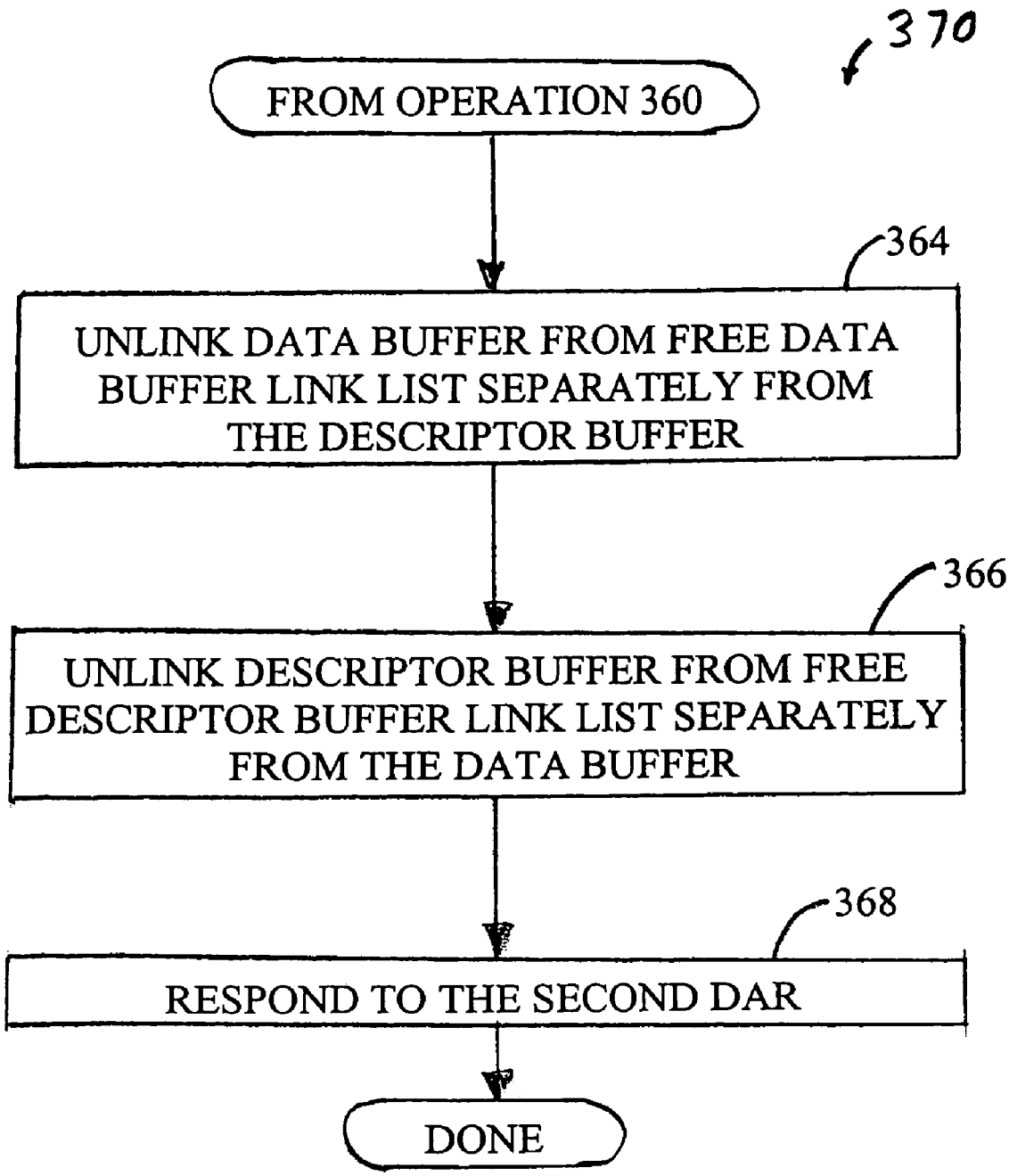

FIG. 2E also shows unlinking of the associated free data buffer 204AF and the associated descriptor buffer 208AF (see arrows 210T and 212T). FIG. 3D illustrates a flow chart 362 showing details of the operation 360, including performing an unlinking operation 364 to separately unlink that free data buffer 204AF from that free data buffer link list 202. The method moves to an operation 366 to separately unlink the free descriptor buffer 208AF from the free descriptor buffer link list 206. In each case, the "separately" refers to the fact that only a data buffer 204A can be taken off, or unlinked from, the free data buffer link list 202, and only a descriptor buffer 208A can be taken off, or unlinked from, the free descriptor buffer link list 206. The unlinking in the operations 364 and 366 includes selection of the appropriate above-described unlinking of the respective associated data buffer 204A and descriptor buffer 204A from the head of the respective link lists 202 and 206, or the above-described unlinking from the middle of the respective link lists 202 and 206, all according to the relative position of those associated data buffers 204A and descriptor buffer 204A on the respective link list 202 or 206 at the time the second DAR (update request) is received. The method moves to an operation 368 in which the second update request is responded to by processing the data request of that update request, and the method is done.

Other Configurations For DAR (Update Request)

It may be understood that other configurations of the architecture 200 may relate to exemplary status of the cache buffer 214 other than that shown in FIG. 2E. There, both the #1 data buffer 204AF and the #1 descriptor buffer 208AF were said to be free. Such other configurations may be after operation 356 of FIG. 3C and thus may also relate to an exemplary status (or state) of the buffer cache 214 upon receipt of the second DAR (update request). Based on the above description, a further DAR may be for old data. The other configurations may relate to operations 354 and 356, and via the search cache algorithm (FIG. 3A, operation 322) the descriptor buffer 208AF corresponding to that old data may be found. Such correspondence to the first old data is indicated by the descriptor value 230a referring to the file ID and file block of the old data that is (or was) stored in one data buffer 204AF. Whereas the FIG. 3C description was in a situation in which both that old descriptor buffer 208A and the old data buffer 204A were #1 on the respective lists 206 and 202, it may also be found that the old data buffer which stores the old data, is at a different position on the free list 202. In this case, the buffer cache 214 is configured to unlink that old free data buffer 204F from the different position on data buffer link list 202. For example, the above-described unlinking from the middle of the list may be used to guide this unlinking via use of FIGS. 2B, and 2C-1 and 2. Alternatively, based on another scheme for priority of taking data buffers 204 off the free data buffer link list 202, the new data buffer may be taken from any position on the link list 202.

In another exemplary variation of status, whereas the FIG. 3C description was in a situation in which its descriptor 230g indicated that there was a current association between that descriptor buffer 208A and one old data buffer 204A, it may also be found that the old data buffer which at one time stored the old data, now no longer stores such old data, and is not free. In this case, the buffer cache 214 is configured to unlink another ("new") free data buffer 204F from the data buffer link list 202. The above-described unlinking from the head of the list may be used to guide this unlinking via use of FIGS. 2B, and 2C-1 and 2. Alternatively, based on another scheme for priority of taking data buffers 204 off the free data buffer link list 202, the new data buffer may be taken from any position on the link list 202. Since the data of the new free data buffer 204F is not for the old data of the current DAR, the stored data of the new data buffer is not valid (value 230h), and must be validated. Also, the value 230g (e.g., pointer value) of the descriptor 230 of the current descriptor buffer 208 with which the new data buffer is associated may be changed to NULL and the corresponding value 230g (pointer value) of the descriptor 230 of the old descriptor buffer 208 with which the new data buffer is to become associated, may be changed to point to the new data buffer. The now-associated and still free buffers 208AF and 204AF are unlinked from the respective list 202 and 206, which may be done by the many unlinking examples above, and then the unlinked buffers 204A and 208A are available to be used to satisfy the DAR for the old data. Such use may be to read the data stored in the data buffer 204A, or to write that data to the disk 240D, for example.

These additional examples illustrate that the many available configurations of the buffer cache 214 permit many actual status situations and DAR to benefit from the efficient buffer cache utilization of the present invention. These include, for example, association and terminating association, the separate operation of the free data buffer list 202 (which depends only on the processing state of one data buffer 204 as a condition of linking to that list 202), the separate operation of the free descriptor buffer list 206 (which depends only on the processing state of one descriptor buffer 204 as a condition of linking to that list 206), the various described ways of unlinking from these respective lists 202 and 206, clearing and populating, all as described above. With these descriptions, one skilled in the art may configure the buffer cache 214 for response to many other DAR situations, all within the scope of the present invention.

Fourth (Third New) DAR

The first two above DAR examples described two situations immediately following initialization. In the first example, no data had been previously stored in the buffer cache 214, and old data resulted and was stored in the buffer cache 214 by a respective data buffer 204A and its associated descriptor buffer 208A. The third DAR example described an update request in which such respective data buffer 204A and its associated descriptor buffer 208A (referred to as "old") which store the old data were free, and thus available to respond to the third DAR, and other variations were described.

Figure 3E:
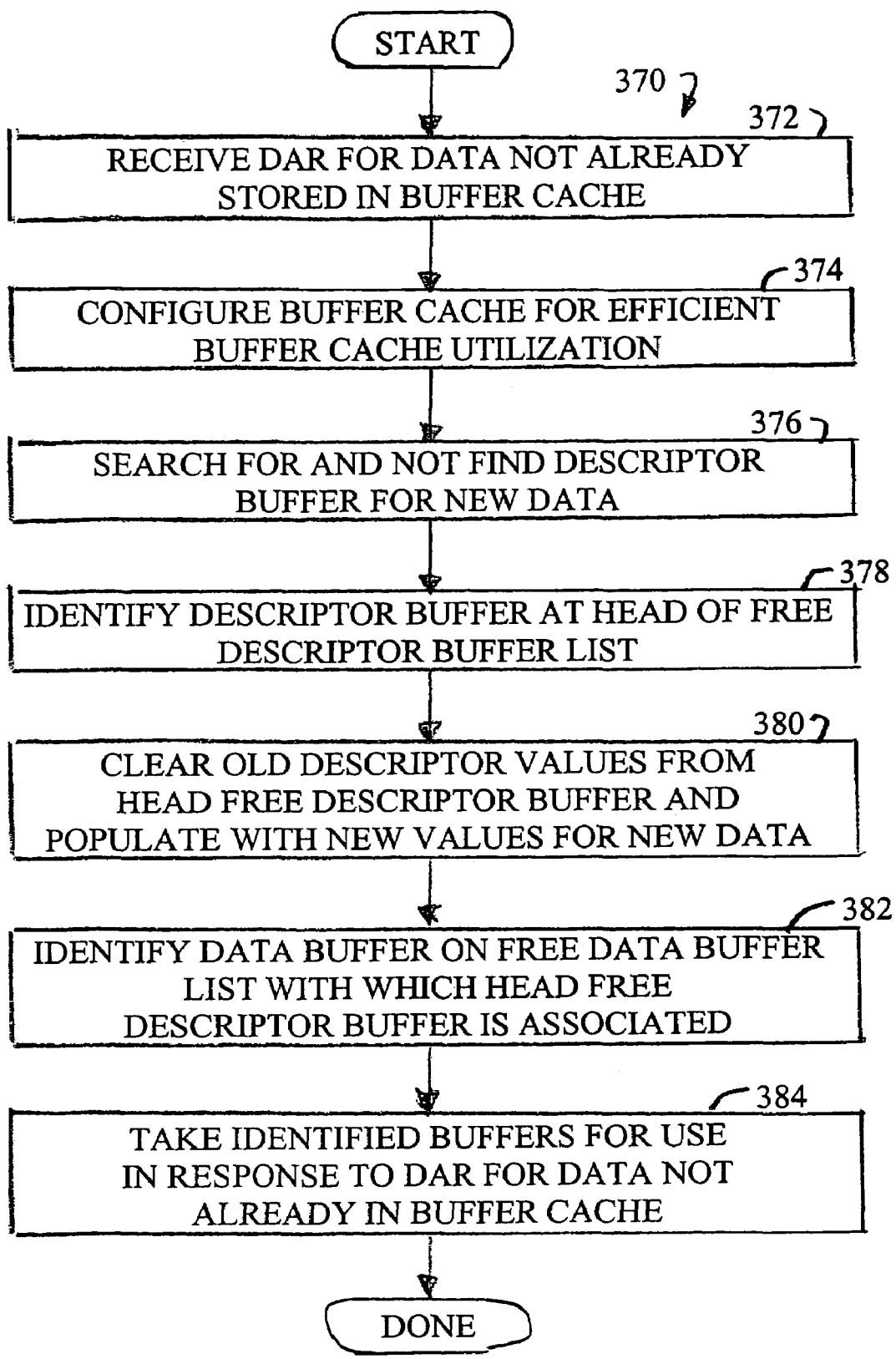

This fourth DAR is an exemplary situation in which the data of the DAR has not already been stored in the buffer cache 214, and there is an old descriptor buffer 208AF that has become positioned at the head of the free descriptor buffer link list 206, and the associated old data buffer 204AF has become positioned between the head and the tail of the free data buffer link list 206. A method of responding to the fourth DAR is shown in FIG. 3E including a flow chart 370 and the method moves to an operation 372 in which the fourth DAR is received. The method moves to an operation 374 in which the buffer cache 214 is configured for efficient buffer cache utilization, as described above with respect to FIG. 3B. The method moves to an operation 376 which is similar to operation 322 of FIG. 3A. Here also, this descriptor buffer 208 is not found because the data is not already stored in the buffer cache 214. The method moves to an operation 376 in which reference is made to the link list header 231 (FIG. 2B) of the free descriptor link list 206 to determine what descriptor buffer 208F is at the head of the link list 206. Again, the link list identifier 232H is referred to in making this determination and the #1 descriptor buffer 208AF is identified. In one situation, in view of the ongoing caching operations, this head free descriptor buffer 208AF may have been populated, but not for the data of the exemplary fourth DAR. Thus, similar to the above operation 330 (FIG. 3A), an operation 380 clears the values of the descriptor 230 of the previous population. In another situation, the #1 descriptor buffer may be identified as 208NF, which was not previously associated. Thus, there are no such values to be cleared for this descriptor buffer 208NF. In each case, the operation 380 hashes the file ID and file offset of such new DAR to create a hash value which identifies a hash bucket corresponding to the to-be-unlinked #1 descriptor buffer 208AF or 208NF. Following hashing, the descriptor buffer 208AF or 208NF is populated with new values of the descriptor 230 corresponding to the new DAR. Such population is described above with respect to FIG. 3A and operation 330. As one example, the appropriate link values 230a through 230n are entered into the descriptor 230 of that particular descriptor buffer 208A for the new DAR. The method moves to an operation 382 in which a data buffer 204AF on the free data buffer list 202 is identified. That sought-after data buffer 204AF is the particular one that is associated with the identified and populated descriptor buffer 208AF. If there is not such an associated data buffer 204F (e.g., if the newly-populated descriptor buffer is 208NF, then the existing value 230g of the identified descriptor buffer 208AF is changed to NULL to terminate the association of this particular descriptor buffer 208F with the last data buffer 204 with which this particular descriptor buffer 208F was associated. Also, the data buffer 204F at the head of the free data buffer list 202 is identified (see FIG. 2B, head identifier 232H), and the particular head data buffer 204F is associated with the identified and populated descriptor buffer 208NF by changing the NULL value 230g to point to this head data buffer 204F, now 204AF. Thus, the descriptor buffer 208NF is now identified as 208AF. When there is such a particular free associated data buffer 204AF, the new data is then, for example, read from the disk 240D into the associated particular data buffer 204A and made valid (descriptor 230, value 230h).

Validating of that particular data buffer 204A is completed to store the data corresponding to the new DAR. The method moves to an operation 384 of taking, or unlinking, that respective associated data buffer 204AF and that descriptor buffer 208AF from the respective list 202 and 206, as described above. Once the descriptor 230 of the particular associated descriptor buffer 208A so indicates, the word "old" may be used to refer to both the particular data buffer 204A that is associated with the particular descriptor buffer 208A, and to that particular descriptor buffer 208A for that data that was just read from the disk 240D into that associated particular data buffer 204A. "old" may also refer to that data in that particular data buffer 204A. As the first of the old data, this old data may be referred to as "first old data". The particular data buffer 204A and particular descriptor buffer 208A are ready to be processed, and the method is done.

Fault Tolerance with Efficient Buffer Cache Utilization

Referring now to FIG. 4, a preferred embodiment of the atomic data/parity update arrangement of the present invention will now be described. A data object 400 includes at least one parity group 402 having a number N of data blocks 404, 406 and 408 and a parity block 410 computed from the N data blocks 404, 406 and 408. The number of parity groups 402 that comprise a data object 400 will depend upon the size of the data object, the size of a data block 404, and the number N (in this example, 3) of data blocks per parity group 402. The data objects are stored in the array storage system under software control of a distributed file system as previously described having at least a number N+1 of input/output manager (IOM) routines 412, 414, 416 and 418. Each IOM routine controls access to a unique portion of the memory space 422, 424, 426 and 428 of the array storage system 250. In the preferred embodiment as has been described, the data object 400 is distributed to the various IOMs 412, 414, 416 and 418 by the memory translator 430 and each IOM has its own metadata store 432, 434, 436 and 438. In this example, N=3 and each parity group 402 is striped across four IOMs. It will be recognized that for a RAID 5 implementation of the preferred embodiment, the parity blocks 410 will be spread across different IOMs although this may not be the case for other embodiments.

When a write request form of DAR is received by the first IOM 412 to store a new block of data 440 that will replace or update an existing data block 406, the first IOM 412 issues an update parity request to a second IOM 416 associated with the parity block 410 corresponding to the block of data 406, 440 that is being changed (in this example—parity group A). The first IOM 412 then issues a write command to write the new block of data 440 to the storage system 422 and waits to receive a write command complete from the storage system 422 for the new block of data 440. The second IOM 416 receives the update parity request from the first IOM 412 and computes a new block of parity 442 for the parity group 402 that includes the block of data 406, 440 that is being changed. The second IOM 416 then issues a write command to write the new block of parity 442 and waits to receive a write command complete from the storage system 426 for the new block of parity 432. Each of the IOMs 412, 414, 416 and 418 maintains a Parity_Update journal 452, 454, 456 and 458, respectively, of all requests and commands received and issued among the IOMs. In the event of an unscheduled stop of the array storage system, the data parity group 402 of the data object 400 is recovered by reviewing the journal entries for both the first IOM 410 and the second IOM 416 and reconstructing the data block 440 or the parity block 442 in response if necessary.

Parity updates in the present invention must be able to be done atomically with the corresponding data updates when maintenance of data integrity after a system crash is required. The Parity_Update journals 452, 454, 456, and 458 keep track of the progress of the parity update in a distributed manner. Because the contents of each Parity_Update journal 452, 454, 456, and 458 are moved to disk or other nonvolatile storage such as NVRAM associated with each IOM 410, 412, 414, and 416, examining all of these journals at the time of recovery insures that the data and parity updates will either both occur or neither will occur in the event of a single disk failure. This is because at least one journal 452, 454, 456, or 458 will have a record of a data/parity update having been started, even if the disk/IOM which crashed was one of the two involved in the data/parity update. Based on how far the update was in the process of being completed and hardened to disk, it may be possible to complete the data/parity update; but if not, then the address pointers in the metadata for both the data and parity IOMs will both be set to the old data and the old parity.

In designing the preferred embodiment of the present invention, the following requirements for the atomic data/parity update process have been used. An update of parity and data should be atomic even if one of the two IOMs (data or parity) goes down in the middle of the update process. Disk space allocations and de-allocations preferably are included in the journal to make these operations reliable independently from FSCK and atomic with the data and parity writes. Replies to the caller should be sent without waiting for any disk IO to complete unless "write-through" is specifically indicated for the file. The design should "roll forward" whenever possible after the first entry to the Parity_Update journal is on disk. The number of disk accesses required for any data and associated parity update should be a minimum. For example, neither data update nor the parity update should be written to disk more than once (e.g., data or parity should not be written both to the Parity_Update journal and to the data file or parity file on disk).

These requirements result in several fundamental principles in the implementation of the preferred embodiment of the present invention. A DAR (update request) is made in a different area of disk from that used for the previous DAR (update request) if the computation of its parity update requires knowledge of that previous data state (e.g., if the data is not "new", is RAID5 protected and is not mirrored).

Referring now to FIG. 5, a more detailed explanation of the preferred operation of the data IOM 412 and the parity IOM 414 from FIG. 4 is described, including how buffers inside the IOMs and MXs preferably are managed, as well as how addresses preferably are kept in the metadata. Such buffers are preferably faster volatile memory spaces accessible to the IOM or MX where data is temporarily stored during data transfer operations, e.g., the buffer cache 214 of the buffer pool 215 described above. The MXs may be memory translators that translate memory access commands between a client protocol and a format that may be processed by such IOMs. The MXs represent a client's point of access to the system memory space.

Data IOM 412 uses a first buffer 502 for data transfer from caller, which in this exemplary case is 430 (MX 130-1). The buffer 502 may be a buffer with a new chunk address if the "old-data" 406 will be needed later. This new chunk allocation will be journaled in the Parity_Update journal 452. This buffer 402 will reference a second "old-data" buffer 504 if one is required. If an "old_data" buffer 504 is required, the two buffers 502,504 will be acquired atomically. An "old-data" buffer 504 will be required if and only if 1. the data write is to a SPANNED file with parity interval greater than one or
2. the file is mirrored, the data write does not start and end on segment boundaries, and the buffer to be written is not in the buffer cache.

In each case, the buffers 502 and 504, for example, may be data buffers 204 described above.

The IOM 412 then writes the new data in buffer to a block on disk 122 (in its new location if it was generated earlier and, in that case, only after merging with old-data for partial-block writes) in foreground but with no blocking. After the parity update has been sent to the parity IOM 416, the IOM 412 frees the buffer 402 and then returns to the caller. Entries in the Parity_Update journal will be used by the send parity, sendpn, and update parity, updatepn, procedures to make the parity update atomic with the data update as follows. First, the data IOM 112 creates the first Parity_Update journal entry, with journal location ID=mj, at the data IOM, containing at least the file ID, offset and the new disk chunk address for the data update and the disk chunk address for the old data if it was needed. These values are also kept in a particular descriptor buffer 512 associated with the particular data buffer 402. If the new disk chunk address is the same as the old disk chunk address, the old disk chunk address field should be NULL. Next, the mj, file ID, offset and the old and new data disk address values are saved in the descriptor 230 of the descriptor buffer 512 and are sent with the parity update request to the parity IOM 416. At the parity IOM 416, if parity data is not already in the buffer cache 412 (e.g. in a data buffer 532), a data buffer 532 is unlinked from the free data buffer list 202 as described above and the old parity data 410 is read into the data buffer 432. Both new and old parity data are needed if old data 406 was needed at the data IOM 412. This is indicated by an old data disk address being non-NULL in the request message. If a new parity disk address is needed (same indication), it will unlink a new parity buffer 434 from the free data buffer list 202 of the buffer cache 214 of the parity IOM 416. The old and new cache pointers for the old and new parity data will be cross-referenced in their descriptor buffers 542 and 544. If parity data is already in the buffer cache and it does not have a cache pointer for new parity data, that old parity data is used and a new cache buffer 234 is allocated for the new parity data. If parity data is already in the buffer cache and it already has a pointer to a new cache buffer for new parity data, there is a wait for the buffer io_valid event to happen in the descriptor buffer 544 of the new parity buffer 434, which is then used as the old cache buffer with a new data buffer for the new parity data. In these cases, the descriptor buffers 512, 542, and 544, for example, may be an associated particular descriptor buffer 208A described above.

At the parity IOM 416, operations create a journal entry, with journal location ID=pj, in the Parity_Update file 456 containing mj, the data IOM's ID, the file ID and offset of the data, the new and old data disk addresses, the file ID and offset for the parity data and the new and old parity disk addresses and also set these values into the descriptor buffer 544 associated with the parity data buffer 534.

At the parity IOM 416, the new parity delta is merged with the data in the old parity data buffer 532 to create the information in new parity data buffer 534. This new parity data in data buffer 534 is written to disk in its new disk location found in the parity data descriptor buffer.

At the data IOM 412, the sendpn can complete when the parity data has been sent. At this time, the data buffer 502 can be freed. When changing an old chunk address to a new chunk address for data and parity, the new chunk address saved in the descriptor buffer will be marked by the descriptor buffer processing routine in the respective data or parity cnode chunk structures when the disk IO is complete. Then, when the respective mj or pj journal entry is on disk, an mj-completed message will be sent (data IOM to parity IOM or parity IOM to data IOM) by the descriptor buffer processing routine saying that the new data or parity respectively has been written. A flag will be cleared in the descriptor buffer indicating that this message has been sent.

When old data buffers 506 and old parity data 532 buffers are used, the old data and old parity data disk addresses respectively (having been saved in their respective descriptor buffers 516 and 542) will only be returned to the bitmap after both the new data and the new parity have been written to their new disk addresses. That is, when the io-complete message is received by one IOM from the other IOM and the other's buffer has been hardened, then the old buffer disk address is deallocated.

When the IO-completed message is received, another flag will be cleared in the descriptor buffer of the respective (data or parity) data buffer and the descriptor buffer processing routine for that IOM (data or parity) will create, respectively, an mj or pj completed entry in their Parity_Update file. After this entry is stored on disk, the processing of the corresponding descriptor buffer, 512 or 544, is finished and that descriptor buffer is freed.

As described above, two bits are reserved as part of a state variable value maintained in each descriptor buffer in the buffer pool 452 and 456 of each IOM (e.g., IOM 412). One bit indicates that the IOM is waiting for a confirmation message that the other IOM has hardened its buffer. The other bit indicates that the IOM has not sent the message to the other IOM indicating that the buffer was hardened. These flags will be set as required when a block is to be modified, and will be cleared by the processing the descriptor buffers when appropriate.

Advantages of Present Invention

Figure 1A:
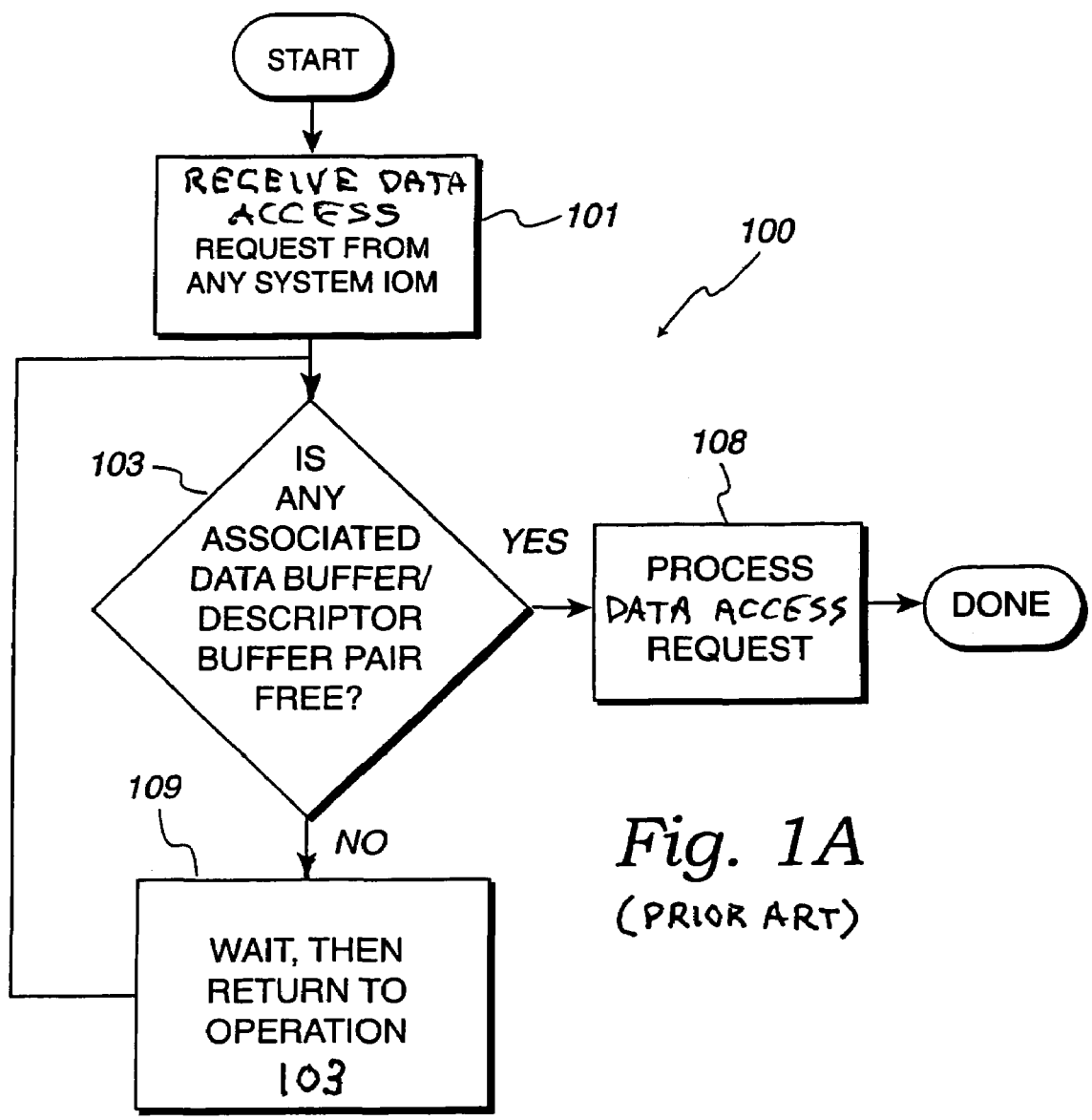
FIG. 1A illustrates a prior art method showing a flow chart in which a data access request is received and a determination is made as to whether any permanently paired data buffer and its associated descriptor buffer are free.
Figure 1B:
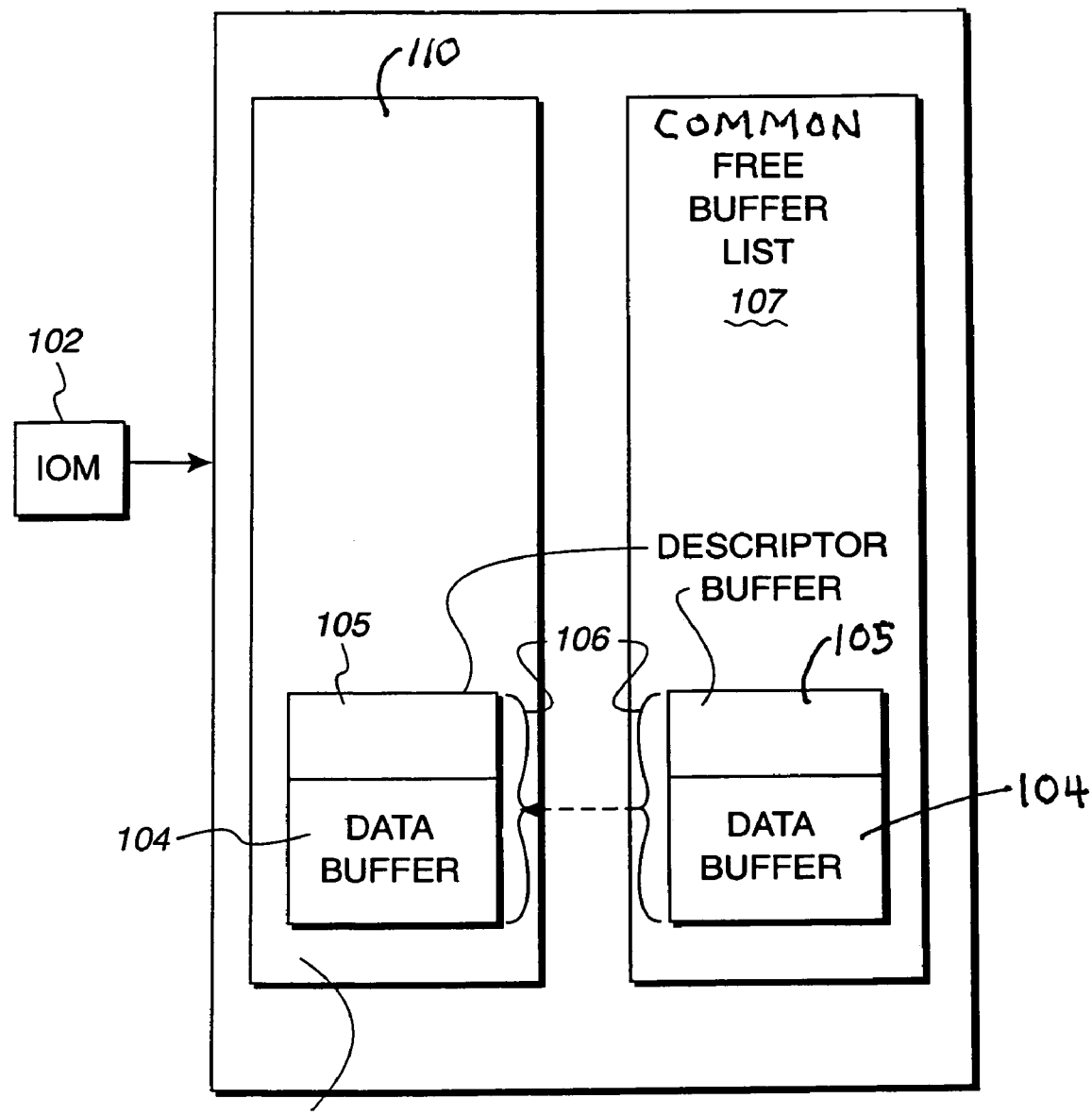
FIG. 1B illustrates a prior art buffer cache with a permanently paired architecture including a free buffer list that contains the permanently paired data buffer and descriptor buffer, illustrating both members of the free pair being taken together and placed for use in a buffer cache.

With the above description in mind, the advantages resulting from the present invention may be understood as including the freeing of the data buffer 204 without freeing the descriptor buffer 208, which is a freeing for other use of the much larger and more costly data buffer 204 as compared to the smaller and less costly descriptor buffer 208. This advantage not only benefits from rapid processing of the data buffer 204, and freeing of that processed data buffer 204 before less important processing of the descriptor buffer 208 has been completed, but has another main advantage. The storage size of the buffer cache 216 may be reduced substantially while still allowing the same or greater number of read/write operations in a unit of time as compared to buffer caches in the current data access architecture and operations. Those current buffer caches have differently associated data buffers and descriptor buffers and different operation, both as shown in FIGS. 1A and 1B, for example, such that those paired data buffers and descriptors remain in an associated relationship both unavailable for other use until the processing of both the data buffer and the associated descriptor buffer have been completed. In contrast, in the present architecture 200, the freeing of the data buffer 204 may occur before the descriptor buffer 208 is freed, which enables quick and more frequent use of the large capacity, more costly data buffer 204 for another use. Also, the other use of the data buffer 204 may proceed without clearing the value of the of the descriptor 230 (of the data buffer 208A that is associated with that data buffer 204A) from that associated descriptor buffer 208A. Rather, the value is only cleared from the freed data buffer 204F.

Although the foregoing invention has been described in some detail for purposes of clarity of understanding, it will be apparent that certain changes and modifications may be practiced within the scope of the appended claims. For example, other types of lists and search algorithms may be used in place of the free buffer lists 202 and 206. Also, other lists may be used to account for the data buffers and descriptor buffers that are in various states, e.g., dirty, or that are still being processed. Accordingly, the present embodiments are to be considered as illustrative and not restrictive, and the invention is not to be limited to the details given herein, but may be modified within the scope and equivalents of the appended claims.

The invention claimed is:

1. A buffer cache having an efficient utilization characteristic, comprising:
    a first data buffer, the first data buffer being configured with a state of completion of processing;
    a first descriptor buffer configured with a state of completion of processing, the state of completion of processing of the first descriptor buffer being independent of the state of completion of processing of the first data buffer;
    a free data buffer list configured to identify only the first data buffer in a free condition, the free condition of the first data buffer being independent of the state of completion of processing of the first descriptor buffer; and
    the buffer cache being configured to place the first data buffer on the free data buffer list according to the state of completion of processing of only the first data buffer.

2. A buffer cache as recited in claim 1, wherein the buffer cache is configured so that the placing of the first data buffer on the free data buffer list may occur immediately upon the state of completion of processing of the first data buffer becoming a processing-complete state.

3. A buffer cache as recited in claim 1, wherein the buffer cache is configured to place the first data buffer on the free data buffer list even though there is an incomplete state of completion of the processing of the first descriptor buffer.

4. A buffer cache as recited in claim 3, wherein the buffer cache further comprises:
    a free descriptor buffer list configured with a plurality of positions to identify only descriptor buffer in a free condition; and
    the configuring of the buffer cache allows taking of the first descriptor buffer from any of the positions on the free descriptor buffer list.

5. A buffer cache as recited in claim 1, wherein:
    the buffer cache is configured with a plurality of data buffers, the plurality including the first data buffer;
    the free data buffer list is a linked list and is configured to list a plurality of including the first data buffer;
    the first descriptor buffer is associated with the first data buffer and has a descriptor having values identifying free data buffers that are previous and next relative to the first data buffer associated with the first descriptor buffer.

6. A buffer cache having an efficient utilization characteristic, comprising:
    a first data buffer;
    a first descriptor buffer configured with a state of completion of processing;
    a free data buffer list configured to identify only the first data buffer in a free condition, the free condition of the first data buffer being independent of the state of completion of processing of the first descriptor buffer;
    a free descriptor buffer list; and wherein:
    the buffer cache is configured to place the first descriptor buffer on the free descriptor buffer list according to the state of completion of processing of only the first descriptor buffer; and
    the buffer cache is further configured to respond to a data access request by taking the first data buffer from the free data buffer list and taking the first descriptor buffer from the free descriptor buffer list, each taking being separate from the other taking.

7. A buffer cache as recited in claim 6, wherein:
    the first descriptor buffer is configured with a descriptor having a first value that identifies the first data buffer as a particular data buffer that is associated with the first descriptor buffer; and
    the first descriptor buffer is configured with the descriptor having a second value that identifies the first data buffer as a particular data buffer that is on the free data buffer list, the second value being independent of the first value.

8. A buffer cache as recited in claim 7, the buffer cache further comprising:
    a second data buffer; wherein:
    the buffer cache is further configured to change the first value to terminate that association, the change being independent of the state of completion of processing of the first descriptor buffer;
    the buffer cache is configured with a second descriptor buffer having a descriptor having a third value that identifies the second data buffer as a particular data buffer that is associated with the second descriptor buffer;
    the buffer cache is configured with the second descriptor buffer having a the descriptor having a fourth value that identifies the second data buffer as a particular data buffer that is on the free data buffer list, the fourth value being independent of the third value;

the buffer cache is further configured to change the third value of the descriptor of the second descriptor buffer to make an association between the first data buffer and the second descriptor buffer; and the buffer cache is further configured to respond to the second and third values and take the first data buffer and the second descriptor buffer in response to a data access request for data not already stored in the buffer cache, that taking being independent of the state of completion of processing of the first descriptor buffer.

9. A buffer cache as recited in claim 8, the buffer cache further comprising:

the buffer cache being further configured with the second descriptor buffer having a descriptor having a fifth value that identifies the second descriptor buffer as a particular descriptor buffer that is on the free descriptor buffer list, the fifth value being independent of the third value; and the buffer cache being further configured to change the first value of the descriptor of the first descriptor buffer to make an association between the second data buffer and the first descriptor buffer.

10. A buffer cache having an efficient data buffer utilization characteristic, the buffer cache comprising:

a plurality of data buffer; and a plurality of descriptor buffers, each of the descriptor buffers having a descriptor configured with a plurality of values, the values comprising values representing a data buffer that is free, the values further comprising values representing a descriptor buffer that is free, the free data buffer values being changeable independently of the free descriptor buffer values to identify one of the data buffers that is free at the same time as a descriptor buffer associated with that one data buffer is not free.

11. A buffer cache as recited in claim 10, further comprising:

a first list header having a first value indicative of one of the free data buffers that is least recently used in the buffer cache, the first list header having a second value indicative of one of the free data buffers that is most recently used in the buffer cache.

12. A buffer cache as recited in claim 11, further comprising:

a second list header having a third value indicative of one of the free descriptor buffers that is least recently used in the buffer cache, the second list header having a fourth value indicative of one of the free descriptor buffers that is most recently used in the buffer cache.

13. A buffer cache having an efficient utilization characteristic in response to a plurality of data access requests, comprising:

a plurality of data buffers;

a plurality of descriptor buffers;

one of the descriptor buffers being configured to be associated with one of the data buffers for response to one of the data access requests;

each of the data buffers and descriptor buffers being configured to be separately processed in response to that one data access request;

a free data buffer list configured as a free data buffer link list linking those data buffers that are free; and the buffer cache being configured to link the one data buffer on the free data buffer list according to a state of completion of processing of only that one data buffer, that linking being independent of a state of completion of processing of the associated descriptor buffer.

14. A buffer cache as recited in claim 13, wherein:

the buffer cache is further configured with a free descriptor buffer list configured as a free descriptor buffer link list linking those descriptor buffers that are free;

the buffer cache is further configured to determine whether each of the associated data buffer and descriptor buffer is on the respective free data buffer link list or respective free descriptor buffer link list; and the buffer cache is configured to unlink the free associated data buffer from the respective free data buffer link list and to unlink the free associated descriptor buffer from the respective free descriptor buffer link list for use in the buffer cache to respond to the one of data access requests.

15. A buffer cache as recited in claim 13, wherein:

the one associated data buffer is a first associated data buffer and the one associated descriptor buffer is a first associated descriptor buffer;

in response to a first data access request, the state of completion of processing of that first associated data buffer becomes complete before the state of completion of processing of that associated descriptor buffer becomes complete;

the buffer cache is further configured with a free descriptor buffer list configured as a free descriptor buffer link list linking those descriptor buffers that are free;

the buffer cache is further configured to determine whether a second descriptor buffer is on the respective free descriptor buffer link list; and the buffer cache is configured to unlink from the free descriptor buffer link list the second free descriptor buffer for use with the first data buffer to respond to a second data access request for data that is not already stored in the buffer cache.

16. A buffer cache as recited in claim 15, wherein:

the buffer cache is further configured to terminate the association of the first associated data buffer and the first associated descriptor buffer and to associate the first data buffer and the second descriptor buffer for response to the second of the data access requests.

17. A buffer cache having an efficient utilization characteristic, comprising:

a plurality of data buffers;

a plurality of descriptor buffers;

the buffer cache being configured so that any one of the data buffers and any one of the descriptor buffers may be in exclusive association with each other and not with any other respective data buffer or descriptor buffer at the same time;

a search cache algorithm for finding, if there is one, a descriptor buffer corresponding to a specified portion of data and, if there is such corresponding descriptor buffer, also finding a data buffer that is both associated with such descriptor buffer and contains the specified portion of data;

a free data buffer list configured to list the data buffers that are in a free state; and a free descriptor buffer list configured to list the descriptor buffers that are in a free state;

the buffer cache being configured to determine whether each of the corresponding descriptor buffer and associated data buffer is on the respective free list.

18. A buffer cache as recited in claim 17, wherein the buffer cache is further configured to respond to a data access request and in response initiate operations of the buffer cache, the operations being to take the associated data buffer off the free data buffer list and to take the corresponding descriptor buffer off the free descriptor list.

19. A buffer cache as recited in claim 17, in which the free data buffer list is configured such that substantially immediately upon completion of processing of the data buffer the data buffer is placed on the free data buffer list independently of completion of processing of the descriptor buffer.

20. A buffer cache as recited in claim 17, wherein the buffer cache is further configured such that the association of the data buffer and the corresponding descriptor buffer is retained even though the free data buffer list lists the data buffer as being free.

21. A buffer cache as recited in claim 17, wherein:
the buffer cache is configured such that upon the search cache algorithm not finding the descriptor buffer corresponding to the specified portion of the data, the buffer cache identifies a free descriptor buffer at the head of the free descriptor buffer list and clears values of that head free descriptor buffer and populates the values with respect to the specified portion of the data; and
the buffer cache is configured to use that populated descriptor buffer with any data buffer on the free data buffer list if no free data buffer is associated with the populated descriptor buffer.

22. A buffer cache as recited in claim 17, wherein the buffer cache is configured to list the descriptor buffer on the free descriptor buffer list when processing of the descriptor buffer has been completed.

23. A fault recovery system having a plurality of input-output managers, each of the input-output managers being configured to manage the storage of a portion of a data object to physical memory, for each input-output manager the system comprising:
a buffer cache comprising a data buffer and a descriptor buffer associated with each other;
a plurality of the associated data buffers and descriptor buffers;
a plurality of unassociated descriptor buffers not associated with any of the data buffers;
the buffer cache being configured to separately process each associated data buffer and to separately process each associated descriptor buffer in the use of the buffer cache;
the fault recovery system further comprising:
a free data buffer list configured to identify data buffers that are in a free state; and
a free descriptor buffer list separate from the free data buffer list and configured to identify descriptor buffers that are in a free state;
each buffer cache being further configured to place any respective data buffer on the separate free data buffer list according to the state of completion of processing of that data buffer, the buffer cache being further configured to place any respective descriptor buffer on the free descriptor buffer list according to the state of completion of processing of that descriptor buffer;
the buffer cache being further configured to break the association of any of the associated data buffers and descriptor buffers to form one or more unassociated descriptor buffers and one or more unassociated data buffers, and to associate one of the unassociated data buffers with one of the unassociated descriptor buffers;
the respective input-output manager facilitating the storage of any portion of the data object to the physical memory by use of an associated data buffer and descriptor buffer from the respective buffer cache of the respective input-output manager; and
the buffer cache of the respective input-output manager being configured to cause one of the respective data buffers to be taken from the respective free data buffer list for use with a respective associated descriptor buffer taken from the respective free descriptor buffer list.

24. A fault recovery system as recited in claim 23, in which the buffer cache is configured so that with one of the associated data buffers on the free data buffer list, the association of the associated descriptor buffer with that data buffer may be retained.

25. A method of providing efficient buffer cache utilization, comprising the operations of:
establishing in the buffer cache a data buffer and a descriptor buffer, the data buffer and the descriptor buffer being configured to be separately processed in the use of the buffer cache;
configuring the buffer cache to free the data buffer according to a state of completion of processing of only the data buffer, wherein that state of completion is independent of a state of completion of processing of the descriptor buffer, the configuring operation further comprising associating the data buffer and the descriptor buffer with each other separately from the freeing of the data buffer.

26. A method as recited in claim 25, in which:
the configuring operation is independent of a state of processing of the descriptor buffer.

27. A method as recited in claim 25, in which:
the configuring operation frees the data buffer immediately upon the state of completion of processing of the data buffer being a complete state.

28. A method as recited in claim 25, in which the configuring operation further comprises associating the data buffer and the descriptor buffer with each other separately from a state of processing of the data buffer and a state of processing of the descriptor buffer.

29. A method as recited in claim 25, wherein the configuring operation further comprises configuring the buffer cache to retain the association of the data buffer and the descriptor buffer while the data buffer is free.

30. A method as recited in claim 25, wherein the method further comprises the operation of configuring the buffer cache with a plurality of the data buffers and a plurality of the descriptor buffers; and wherein:
the operation of configuring to free the data buffer comprises configuring a free data buffer link list linking those data buffers that are free, the linking of the free data buffers is according to the state of completion of processing of only each respective data buffer;
the buffer cache is further configured to free the descriptor buffers by configuring a free descriptor buffer link list linking those descriptor buffers that are free, the linking of the free descriptor buffers is according to a state of completion of processing of only each respective descriptor buffer;
the buffer cache is further configured to unlink from the data buffer link list those data buffers that are to be used to cache data and to unlink from the descriptor buffer link list those descriptor buffers that are to be used to cache data; and
the buffer cache is further configured with a link list header corresponding to each of the free data buffer link list and the free descriptor buffer link list, wherein the respective link list header is configured to identify the free data buffer that is at a head of the free data buffer link list and the respective descriptor buffer link list header is configured to identify the free descriptor buffer that is at a head of the free descriptor buffer link list.

31. A method as recited in claim 30, wherein the buffer cache is further configured to respond to a data access request using the data buffer link list header to identify the head data buffer to unlink from the head of the data buffer link list and using the descriptor buffer link list header to identify the head descriptor buffer to unlink from the head of the descriptor buffer link list.

32. A method of providing efficient buffer cache utilization, comprising the operations of:
  establishing in the buffer cache a data buffer and a descriptor buffer, the data buffer and the descriptor buffer being configured to be separately processed in the use of the buffer cache; and
  configuring the buffer cache to free the data buffer according to a state of completion of processing of only the data buffer, wherein that state of completion is independent of a state of completion of processing of the descriptor buffer, the configuring operation further comprising the operations of:
  configuring the buffer cache to free the descriptor buffer according to a state of completion of processing of only the descriptor buffer; and
  associating the data buffer and the descriptor buffer with each other separately from each of the configuring operations.

33. A method as recited in claim 32, in which the operation of configuring the buffer cache to free the descriptor buffer further comprises retaining the association of the data buffer and the descriptor buffer while the descriptor is buffer free.

34. A method of providing efficient buffer cache utilization, comprising the operations of:
  establishing in the buffer cache a data buffer and a descriptor buffer, the data buffer and the descriptor buffer being configured to be separately processed in the use of the buffer cachet;
  configuring the buffer cache to free the data buffer according to a state of completion of processing of only the data buffer, wherein that state of completion is independent of a state of completion of processing of the descriptor buffer;
  configuring the buffer cache with a plurality of data buffers;
  configuring the buffer cache to receive a data access request, wherein a response to the data access request may be made using one of the data buffers associated with a second descriptor buffer with which the one data buffer is not currently associated, the one data buffer being currently associated with a first descriptor buffer; and
  configuring the buffer cache to end the current association of the one data buffer and the first descriptor buffer with each other and to associate the one data buffer and the second descriptor buffer with each other.

35. A method of efficiently managing the storage of data in a buffer cache in response to successive data access requests, comprising the operations of:
  receiving a first data access request that requires access to data in the buffer cache;
  searching the buffer cache for a descriptor buffer corresponding to the data to be accessed in the buffer cache;
  if the searching does not find that corresponding descriptor buffer, determining whether there is any free data buffer in a free data buffer list in the buffer cache, wherein the free data buffer list is separate from a free descriptor list;
  if there is any free data buffer in the free data buffer list in the buffer cache, searching the buffer cache for a free descriptor buffer in a free descriptor buffer list that is separate from the free data buffer list; and
  if there is a free descriptor buffer in the free descriptor buffer list, taking each of the free data buffer and the free descriptor buffer from the respective free buffer list for use in response to the first data access request.

36. A method as recited in claim 35, comprising the further operations of:
  updating a value of a descriptor of the taken descriptor buffer to point to the taken data buffer to associate the taken data buffer with the taken descriptor buffer; and
  responding to the first data access request by writing data into the taken data buffer or reading data from the taken data buffer.

37. A method as recited in claim 35, wherein a state of operation of the taken data buffer for data caching is indicated by descriptor values of the associated taken descriptor buffer, the values comprise a not-dirty descriptor value and a zero count descriptor value, the method comprising the further operation of:
  preparing the buffer cache for further caching operations using that taken data buffer, the preparing comprising the operation of freeing that taken data buffer by returning that data buffer to the free data buffer list independently of a state of operation of the taken descriptor buffer for data caching.

* * * * *

UNITED STATES PATENT AND TRADEMARK OFFICE
CERTIFICATE OF CORRECTION

PATENT NO.        : 7,210,001 B2
APPLICATION NO.   : 10/825717
DATED             : April 24, 2007
INVENTOR(S)       : Frey et al.

Page 1 of 1

It is certified that error appears in the above-identified patent and that said Letters Patent is hereby corrected as shown below:

On the Title Page, Item (63) Related U.S. Application Data should read

Continuation-in-part of (1) Application Number 10/717,314, filed on November 18, 2003; and (2) Application Number 09/691,579, filed on October 18, 2000, now Patent No. 6,725,392, which is a continuation-in-part of (a) 09/261,708, filed on March 3, 1999, now Patent No. 6,922,688; and (b) Application Number 09/439,440, filed on November 15, 1999, now Patent No. 6,530,036.

Signed and Sealed this

Fourteenth Day of August, 2007

JON W. DUDAS
*Director of the United States Patent and Trademark Office*